(12) United States Patent
Hook

(10) Patent No.: US 7,510,287 B2
(45) Date of Patent: Mar. 31, 2009

(54) WIRE COVER ASSEMBLY FOR VEHICLE INTERIOR MIRROR

(75) Inventor: Richard R. Hook, Hudsonville, MI (US)

(73) Assignee: Donnelly Corporation, Holland, MI (US)

( * ) Notice: Subject to any disclaimer, the term of this patent is extended or adjusted under 35 U.S.C. 154(b) by 261 days.

(21) Appl. No.: 11/584,697

(22) Filed: Oct. 20, 2006

(65) Prior Publication Data

US 2007/0091626 A1     Apr. 26, 2007

Related U.S. Application Data

(60) Provisional application No. 60/729,430, filed on Oct. 21, 2005.

(51) Int. Cl.
G02B 7/182 (2006.01)
(52) U.S. Cl. .................................. 359/872; 248/481
(58) Field of Classification Search ................. 359/872, 359/875, 876, 877; 248/479, 481, 549, 551; 362/494
See application file for complete search history.

(56) References Cited

U.S. PATENT DOCUMENTS

| | | |
|---|---|---|
| 541,727 A | 6/1895 | Dennis |
| 1,521,508 A | 12/1924 | Denoux |
| 1,800,797 A | 4/1931 | Hoople |
| 1,857,095 A | 5/1932 | Glowacki |
| 2,414,223 A | 1/1947 | De Virgilis |
| 2,456,182 A | 12/1948 | Goble |
| 2,763,188 A | 9/1956 | Bertell |
| 2,856,815 A | 10/1958 | Ross |
| 2,921,808 A | 1/1960 | David |
| 2,973,980 A | 3/1961 | Vogt et al. |
| 3,009,712 A | 11/1961 | Williams |
| 3,022,096 A | 2/1962 | Schwartz |
| 3,104,897 A | 9/1963 | Berger |
| 3,177,020 A | 4/1965 | Dumpis |
| 3,367,616 A | 2/1968 | Bausch et al. |
| 3,374,016 A | 3/1968 | Melton et al. |
| 3,448,553 A | 6/1969 | Herr et al. |
| 3,498,579 A | 3/1970 | Vicary |
| 3,530,495 A | 9/1970 | Kindel |
| 3,601,352 A | 8/1971 | Jensen et al. |

(Continued)

FOREIGN PATENT DOCUMENTS

WO      WO 03/095269 A1      11/2003

(Continued)

*Primary Examiner*—Euncha P Cherry
(74) *Attorney, Agent, or Firm*—Van Dyke, Gardner, Linn & Burkhart LLP

(57) ABSTRACT

An interior rearview mirror assembly for a vehicle includes a circuit element having a mirror wire harness extending therefrom and extending from a mirror casing. The mirror assembly includes a mirror mounting assembly having a mounting base and a support arm for adjustably mounting the mirror reflective element at the mounting base. The mirror wire harness is routed along an exterior surface of the support arm and an exterior surface of the mounting base. A support arm sleeve is attached at an exterior of the support arm and routes and may contain the mirror wire harness substantially along the support arm and within the support arm sleeve. A mounting base cover assembly is disposed at the mounting base of the mirror assembly and substantially conceals the mounting base and the mirror wire harness at the mounting base.

29 Claims, 10 Drawing Sheets

U.S. PATENT DOCUMENTS

| | | | |
|---|---|---|---|
| 3,622,112 A | 11/1971 | Stroh | |
| 3,635,435 A | 1/1972 | Perison, Sr. | |
| 3,774,996 A | 11/1973 | Donnelly | |
| 3,841,769 A | 10/1974 | Bowerman | |
| 4,254,931 A | 3/1981 | Aikens et al. | |
| 4,382,572 A | 5/1983 | Thompson | |
| 4,492,488 A | 1/1985 | Warshawsky | |
| 4,614,412 A | 9/1986 | Cohen | |
| 4,632,348 A | 12/1986 | Keesling et al. | |
| 4,646,210 A | 2/1987 | Skogler et al. | |
| 4,822,140 A | 4/1989 | Mittelhauser | |
| 4,930,742 A | 6/1990 | Schofield et al. | |
| 4,936,533 A | 6/1990 | Adams et al. | |
| 5,100,093 A | 3/1992 | Rawlinson | |
| 5,100,095 A | 3/1992 | Haan et al. | |
| 5,308,247 A | 5/1994 | Dyrdek | |
| 5,327,288 A | 7/1994 | Wellington et al. | |
| 5,521,760 A | 5/1996 | De Young et al. | |
| 5,555,136 A | 9/1996 | Waldmann et al. | |
| 5,572,354 A | 11/1996 | Desmond et al. | |
| 5,576,687 A | 11/1996 | Blank et al. | |
| 5,582,383 A | 12/1996 | Mertens et al. | |
| 5,632,092 A | 5/1997 | Blank et al. | |
| 5,669,698 A | 9/1997 | Veldman et al. | |
| 5,671,996 A | 9/1997 | Bos et al. | |
| 5,680,263 A | 10/1997 | Zimmermann et al. | |
| 5,820,097 A | 10/1998 | Spooner | |
| 5,878,370 A | 3/1999 | Olson | |
| 5,984,482 A | 11/1999 | Rumsey et al. | |
| 6,124,886 A | 9/2000 | DeLine et al. | |
| 6,222,460 B1 | 4/2001 | DeLine et al. | |
| 6,227,675 B1 | 5/2001 | Mertens et al. | |
| 6,227,689 B1 | 5/2001 | Miller | |
| 6,229,319 B1 | 5/2001 | Johnson | |
| 6,315,421 B1 | 11/2001 | Apfelbeck et al. | |
| 6,318,870 B1 | 11/2001 | Spooner et al. | |
| 6,329,925 B1 | 12/2001 | Skiver et al. | |
| 6,483,438 B2 | 11/2002 | DeLine et al. | |
| 6,523,964 B2 | 2/2003 | Schofield et al. | |
| 6,540,193 B1 | 4/2003 | DeLine | |
| 6,593,565 B2 | 7/2003 | Heslin et al. | |
| 6,598,980 B2 | 7/2003 | Marusawa et al. | |
| 6,690,268 B2 | 2/2004 | Schofield et al. | |
| 6,824,281 B2 | 11/2004 | Schofield et al. | |
| 6,847,487 B2 | 1/2005 | Burgner | |
| 6,877,709 B2 | 4/2005 | March et al. | |
| 6,877,888 B2 | 4/2005 | DeLine et al. | |
| 6,983,920 B2 | 1/2006 | DeLine | |
| 7,004,593 B2 | 2/2006 | Weller et al. | |
| 7,110,156 B2 | 9/2006 | Lawlor et al. | |
| 7,156,358 B2 | 1/2007 | March et al. | |
| 7,209,278 B2 | 4/2007 | Lawlor et al. | |
| 7,255,451 B2 | 8/2007 | McCabe et al. | |
| 7,264,217 B2 | 9/2007 | DeLine et al. | |
| 2002/0088916 A1* | 7/2002 | March et al. | 248/549 |
| 2005/0078389 A1 | 4/2005 | Kulas et al. | |
| 2006/0038668 A1 | 2/2006 | DeWard et al. | |
| 2006/0050018 A1 | 3/2006 | Hutzel et al. | |
| 2006/0061008 A1 | 3/2006 | Karner et al. | |
| 2006/0132939 A1 | 6/2006 | Blank et al. | |
| 2006/0255960 A1 | 11/2006 | Uken et al. | |
| 2007/0019426 A1 | 1/2007 | Uken | |

FOREIGN PATENT DOCUMENTS

| | | |
|---|---|---|
| WO | WO 03/095269 A3 | 11/2003 |
| WO | WO 2004/076971 A2 | 9/2004 |

* cited by examiner

WIRE COVER ASSEMBLY FOR VEHICLE INTERIOR MIRROR

CROSS REFERENCE TO RELATED APPLICATION

The present application claims the benefit of U.S. provisional application Ser. No. 60/729,430, filed Oct. 21, 2005, which is hereby incorporated herein by reference in its entirety.

FIELD OF THE INVENTION

The present invention relates generally to the field of interior rearview mirror assemblies for vehicles and, more particularly, to interior rearview mirror assemblies which incorporate an accessory or feature, particularly an electronic accessory or feature.

BACKGROUND OF THE INVENTION

Mounting arrangements or assemblies for mounting an interior rearview mirror assembly to an interior portion of a vehicle typically include a mounting arm that is pivotally attached to the mirror assembly and/or to a channel mount or mounting base, which in turn mounts to the interior portion of the vehicle. For example, a typical mounting assembly may include a mounting arm with a ball member or spherical member or portion at each end, with one end being pivotally received in a socket at the mirror assembly (or at a toggle portion of the mirror assembly for a prismatic mirror) and the other end being pivotally received in a socket at the mounting channel, which may be secured to a mounting button or the like at the interior surface of the windshield of the vehicle.

Typically, the ball members of the mounting arm are pressed into the respective sockets, such as via a machine or the like, to insert the ball member through the narrowed end of the socket and to secure the ball members within the sockets. The ball members are typically metallic elements at distal ends of a support arm tube, the inner hollow of which is occupied by a spring, and the ball members are received within polymeric sockets and biased via the biasing member or spring to provide the desired clamping or degree of resistance of pivotal movement of the ball member relative to the socket.

It is often desirable to provide an electronic feature in or at a vehicular interior rearview mirror assembly, such as a trainable garage door opener, a compass sensor and/or compass display, a tire pressure monitoring system receiver and/or display and/or the like, often along with the user inputs or buttons or switches associated with such systems and/or displays. The electronic feature or accessory or circuitry is typically connected to a power supply or control of the vehicle, such as via a vehicle wiring harness that may extend from the cabin ceiling or vehicle headliner and may plug into the back of the mirror casing. Although it is known to route a mirror wire extending from the mirror through a support arm of the mirror assembly, such as is described in U.S. Pat. No. 5,984,482, which is hereby incorporated herein by reference in its entirety, such routing of the wire through the support arm requires particular mounting components and may be difficult to accomplish.

Therefore, there is a need in the art for a mirror wire management system that overcomes the shortcomings of the prior art.

SUMMARY OF THE INVENTION

The present invention provides an interior rearview mirror assembly which has a wire management system or wire cover assembly for covering and routing an electrical wire from generally at a rear portion of the mirror casing to generally at the vehicle headliner. The wire cover assembly may be readily assembled at the mirror assembly before the mirror assembly is installed in a vehicle and/or at the mirror assembly and windshield after the mirror assembly is installed in the vehicle.

According to an aspect of the present invention, an interior rearview mirror assembly for a vehicle includes a mirror casing, a reflective element, a mounting arrangement and a wire cover or wire management assembly or system. The mirror assembly includes at least one electrical accessory or circuitry and an electrical mirror wire harness extending from or into the casing. The mirror mounting assembly includes a mounting base or channel mount and a support arm that pivotally or adjustably attach or mount the mirror casing and/or reflective element to an interior portion of the vehicle, such as to the interior surface of a vehicle windshield. The wire cover assembly preferably includes a mounting base cover assembly or element or portion disposed at the mounting base or channel mount. The mounting base cover assembly may include a lower cover portion and an upper cover portion, which are connectable together around the mounting base, and which may secure a connecting end of the mirror wire (such as a connector end of the mirror wire harness having a connector thereat) at an upper region of the base cover portion. The connecting end or connector end of the mirror wire harness is electrically connectable to a connector end of a vehicle wire harness that extends from or to or at a headliner of the vehicle. Preferably, the wire cover assembly or wire management system includes a support arm sleeve or sleeve member or portion that attaches to the support arm of the mounting arrangement and that substantially routes and contains and conceals the mirror wire along the support arm and generally between the casing and the mounting base and base cover portion. The wire management system or wire cover assembly (comprising the mounting base cover assembly and support arm sleeve) thus substantially contains and routes the mirror wire therewithin and substantially or wholly conceals the mirror wire from view at and along the support arm and mounting base of the mirror assembly.

Optionally, the wire cover assembly or wire management system may include an upper channel member that preferably attaches to the mounting base cover assembly (such as at an upper cover portion of the mounting base cover assembly) and extends between the mounting base cover assembly and the vehicle headliner, and substantially contains and routes the vehicle wire therewithin and substantially or wholly conceals the wire from view along the windshield of the vehicle and generally above the mounting base or channel mount of the mirror assembly. Thus, the support arm sleeve, the mounting base cover assembly and the upper channel member, when all assembled in the vehicle, cooperate to substantially conceal the entire routing of the mirror wire harness (and the vehicle wire harness in applications where the vehicle wire harness extends down from the headliner of the vehicle) along substantially the entire length of the wire harness or harnesses from a wire exit or entrance at the mirror casing to a wire exit or entrance at the vehicle headliner.

An operator or operators at a vehicle assembly plant thus may mount the mirror assembly to an interior portion of the vehicle (such as to a mirror mounting button at an interior surface of the vehicle windshield), and may (or another operator may) readily route and contain/conceal the wires or wire harnesses between the mirror casing and the vehicle headliner via the wire cover or wire management system or assembly of the present invention. For example, the mounting base cover portion and support arm sleeve of the wire cover assembly may be provided to the vehicle assembly plant with the mirror assembly (such as a mirror unit having the mounting assembly and mounting base cover assembly and support arm sleeve assembled as a unit), and with the mirror wire routed along the support arm and within the support arm sleeve and along the mounting base and within the mounting base cover assembly. An operator or operators thus may readily install the mirror assembly and wire cover assembly unit in the vehicle and connect the vehicle wire harness to the mirror wire harness, and then may cover or conceal the vehicle wire harness via the channel member so that the vehicle wire harness is substantially contained or concealed between the mounting base cover portion and the vehicle headliner. Optionally, the wire cover assembly may be assembled at the mirror assembly and windshield after the mirror assembly is installed in the vehicle. For example, an operator may position the wires or wire harnesses at a generally desired location and may snap or readily position or otherwise mechanically attach the wire cover assembly components (including the mounting base cover assembly and support arm sleeve) to the mirror mounting assembly and/or other wire cover assembly components and/or the vehicle headliner to substantially route and contain the wires or wire harnesses along the wire cover assembly and substantially out of view of a person viewing the mirror assembly.

Therefore, the present invention provides an interior rearview mirror assembly which provides a wire cover or wire management assembly or system that substantially contains and/or conceals the mirror wire that extends from the mirror casing. The wire cover assembly allows for an operator at a vehicle assembly plant to readily electrically connect the vehicle wire to the mirror wire (which may provide power and control and/or communication signals between the mirror electronics and the vehicle) and to readily substantially cover and/or conceal or manage the wires without having to route or thread wires through and along passageways and the like. The wire cover assembly thus provides enhanced operator processing at a vehicle assembly plant and thus may provide reduced assembly time and costs.

These and other objects, advantages, purposes and features of the present invention will become apparent upon review of the following specification in conjunction with the drawings.

DESCRIPTION OF THE PREFERRED EMBODIMENTS

Figure 1:
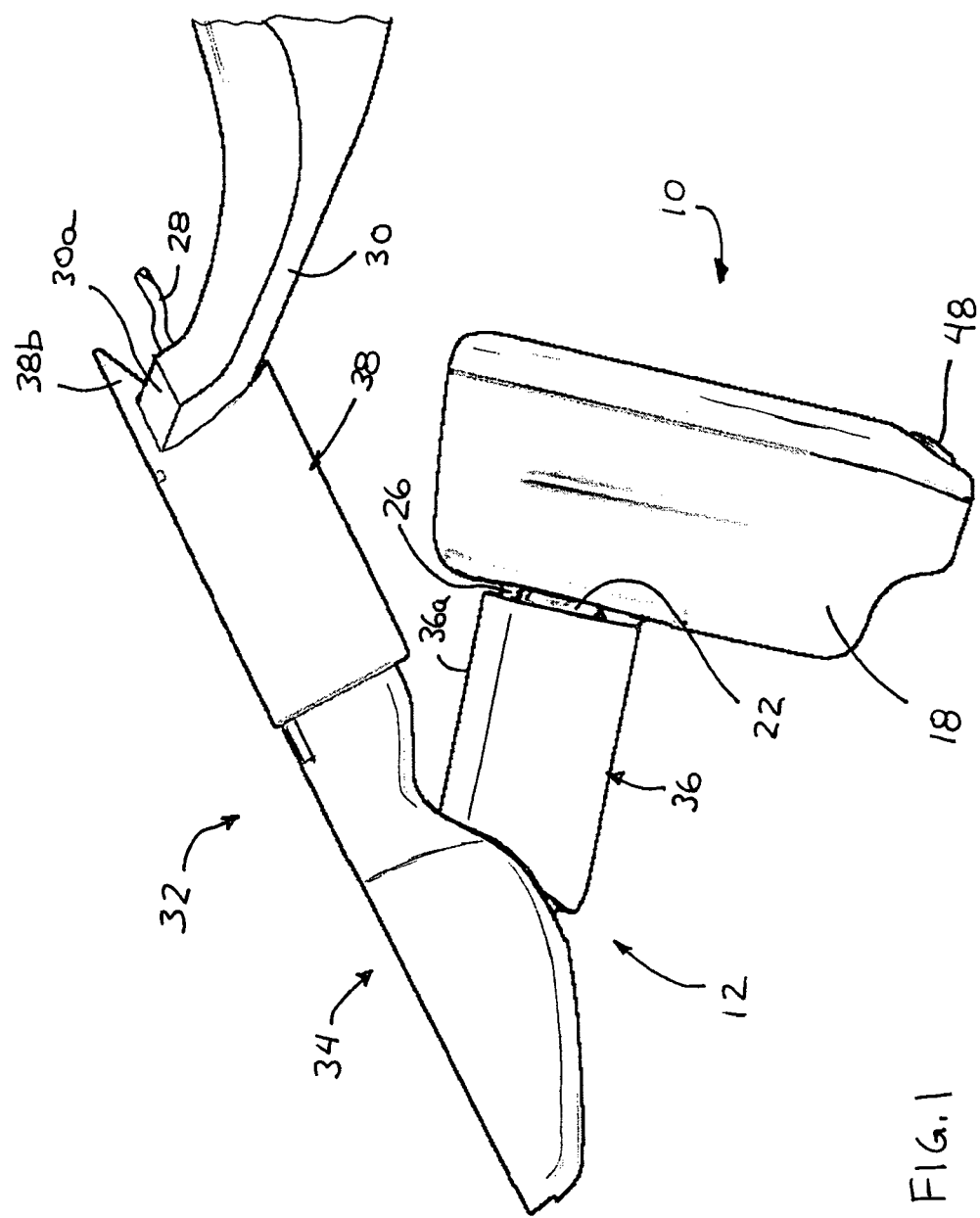
FIG. 1 is a side elevation of an interior rearview mirror assembly and mounting assembly in accordance with the present invention.

Referring now to the drawings and the illustrative embodiments depicted therein, an interior rearview mirror assembly 10 of a vehicle is pivotally or adjustably mounted to an interior portion of a vehicle, such as via a double ball mounting arrangement or assembly 12 (FIGS. 1, 2 and 6-11). Mirror assembly 10 includes a reflective element 17 (FIG. 11) and a polymeric-material housing or casing 18. The mounting or assembly 12 includes a support arm 22 and a mounting or base portion or channel mount 24, and adjustably mounts the mirror casing 18 and/or the reflective element 17 to an interior portion of the vehicle, such as to an interior surface of a windshield of the vehicle or the like. Mirror assembly 10 includes an electronic accessory or display or circuitry or circuit element 23 (FIG. 11) and an electrical wire or cable 26 (such as a multi-wire cable or ribbon cable or other suitable electrical conductor or link or the like) that extends from circuit element 23 (such as a printed circuit board or flexible circuit element or the like) and extends from a rear portion of mirror casing 18 for electrical connection with a vehicle wiring harness or cable 28 that is generally at or extends from the headliner 30 of the vehicle, as discussed below. A wire routing or wire cover or wire management assembly or system 32 functions to substantially conceal and retain and guide the wire or cables 26, 28 as they are routed between casing 18 and the headliner 30, as also discussed below.

The wire routing or wire cover assembly or system functions to substantially conceal the wire or cable 26 from where the cable exits the rear of the mirror casing to where the cable enters the vehicle headliner at the upper region of the windshield. Optionally, the mirror wire or cable may be sufficiently long enough to extend along the support arm 22 of the mounting assembly 12 and curve along or above the mounting base 24 and along the windshield all or substantially all the way up to a vehicle wire harness at the headliner of the vehicle, whereby the wire management system of the present invention substantially conceals the mirror wire between the mirror casing and the headliner, as discussed below. Optionally, the mirror wire or cable may be sized so as to end generally at and above the mirror mounting base 24, and may have an electrical connector at an end of the wire or cable, whereby the wire management system of the present invention may secure and/or conceal the connector to facilitate electrical connection between the mirror wire or cable and a vehicle wire harness (and connector) extending down from the vehicle headliner, as also discussed below. The term "wire" or "wire harness" or "cable" or other similar terms as used herein is/are intended to encompass any suitable wire or link (of the vehicle or of the mirror) and may comprise or encompass a single electrical wire, a cable of wires, such as twisted wires or the like, a ribbon cable, a wire harness, a fiber optic cable or link and/or any other suitable wiring or electrical link, while remaining within the spirit and scope of the present invention.

Thus, the wire management or wire cover system or assembly of the present invention provides covert routing of the mirror wire or cable and/or vehicle wire or cable as the wires/cables are routed along an exterior surface of the mirror mounting assembly and at or along or partially along the vehicle windshield between the mirror casing and the vehicle headliner. The support arm sleeve, the mounting base cover assembly and the upper channel member, when all assembled in the vehicle, thus cooperate to substantially conceal the entire routing of the mirror wire harness (and the vehicle wire harness in applications where the vehicle wire harness extends down from the headliner of the vehicle) along substantially the entire length of the wire harness or harnesses from a wire exit or entrance at the mirror casing (such as at a generally central opening in the mirror casing at or near the location where the ball member or support arm is located when the mirror is assembled together) to a wire exit or entrance at the vehicle headliner (such as a location where a connector of the vehicle wire harness is at or near or located or where the vehicle wire harness extends from the vehicle headliner for connection with the mirror wire harness).

Optionally, and desirably, the cover portions or elements of the wire management system can be molded in plastic and thus can be made in different colors, or with different styling features, textures, and/or the like, and thus may provide an aesthetically pleasing appearance at the mirror assembly and windshield, such as by utilizing aspects of the mirror assemblies described in U.S. patent application Ser. No. 10/556,754, filed Nov. 15, 2005, now U.S. Pat. No. 7,289,037; Ser. No. 11/021,065, filed Dec. 23, 2004 by McCabe et al. for ELECTRO-OPTIC MIRROR CELL, now U.S. Pat. No. 7,255,451; Ser. No. 11/451,639, filed Jun. 13, 2006; and/or Ser. No. 11/226,628, filed Sep. 14, 2005by Karner et al., which are hereby incorporated herein by reference in their entireties. For example, the plastic cover portions or elements may be formed and provided in a manner that is aesthetically pleasing and that fits into or corresponds to the styling characteristics of the vehicle, or that may be a personalized or customized appearance that may correspond to a desired or selected appearance as selected by the consumer or owner of the vehicle.

The mirror assembly may include any type of mirror casing and/or bezel portion or frame portion. Optionally, a frame portion and/or bezel portion may attach to the rear casing to assemble the reflective element to the rear casing. The rear casing may comprise any type of mirror casing and may house or contain electronic circuitry therein. Optionally, the rear casing portion may comprise a plastic molded cap or cap portion, such as the types described in U.S. patent application Ser. No. 10/556,754, filed Nov. 15, 2005, now U.S. Pat. No. 7,289,037; U.S. provisional applications, Ser. No. 60/471,546, filed May 19, 2003; Ser. No. 60/525,537, filed Nov. 26, 2003; and Ser. No. 60/556,259, filed Mar. 25, 2004, and in PCT Application No. PCT/US04/15424, filed May 18, 2004, which are hereby incorporated herein by reference in their entireties. Such a rear casing portion may be provided in a desired or selected color or texture or appearance to match the styling characteristics of the vehicle or to match a customized appearance selected by the consumer or owner of the vehicle or the like, such as by utilizing aspects of the mirror assemblies described in U.S. patent application Ser. No. 10/556,754, filed Nov. 15, 2005, now U.S. Pat. No. 7,289,037; Ser. No. 11/021,065, filed Dec. 23, 2004 by McCabe et al. for ELECTRO-OPTIC MIRROR CELL, now U.S. Pat. No. 7,255,451; Ser. No. 11/451,639, filed Jun. 13, 2006; and/or Ser. No. 11/226,628, filed Sep. 14, 2005 by Karner et al., which are hereby incorporated herein by reference in their entireties.

Mounting arm or support arm 22 may comprise a plastic or polymeric support arm, and mounting base portion or channel mount 24 may comprise an aluminum or metallic or plastic or polymeric channel mount, such as the types described in U.S. Pat. No. 6,877,709; and/or U.S. patent application Ser. No. 11/226,628, filed Sep. 14, 2005 by Karner et al.; and/or Ser. No. 10/887,298, filed Jul. 8, 2004, now U.S. Pat. No. 7,156,358, which are hereby incorporated herein by reference in their entireties. The ends of support arm 22 may be pivotally attached at the base portion 24 and the mirror casing 18 (or at a mounting or attaching portion of a circuit board or attachment plate at the reflective element), in order to pivotally mount the mirror casing or reflective clement to the base portion 24, whereby the mirror casing and reflective element are pivoted about two pivot joints of the mounting arrangement. The double pivot mounting assembly or arrangement of the mirror assembly may utilize aspects of the mounting assemblies described in U.S. patent application Ser. No. 11/305,637, filed Dec. 16, 2005, published Jun. 22, 2006 as U.S. Publication No. US-2006-0132939-A1, now U.S. Pat. No. 7,329,013; Ser. No. 11/328,325, filed Jan. 9, 2006, published Jun. 29, 2006 as U.S. Publication No. US-2006-0138299-A1, now U.S. Pat. No. 7,264,217; Ser. No. 10/397,599, filed Mar. 26, 2003, now U.S. Pat. No. 6,983,920; and Ser. No. 09/470,791, filed Dec. 23, 1999, now U.S. Pat. No. 6,540,193, the disclosures of which are hereby incorporated herein by reference in their entireties.

Figure 10:
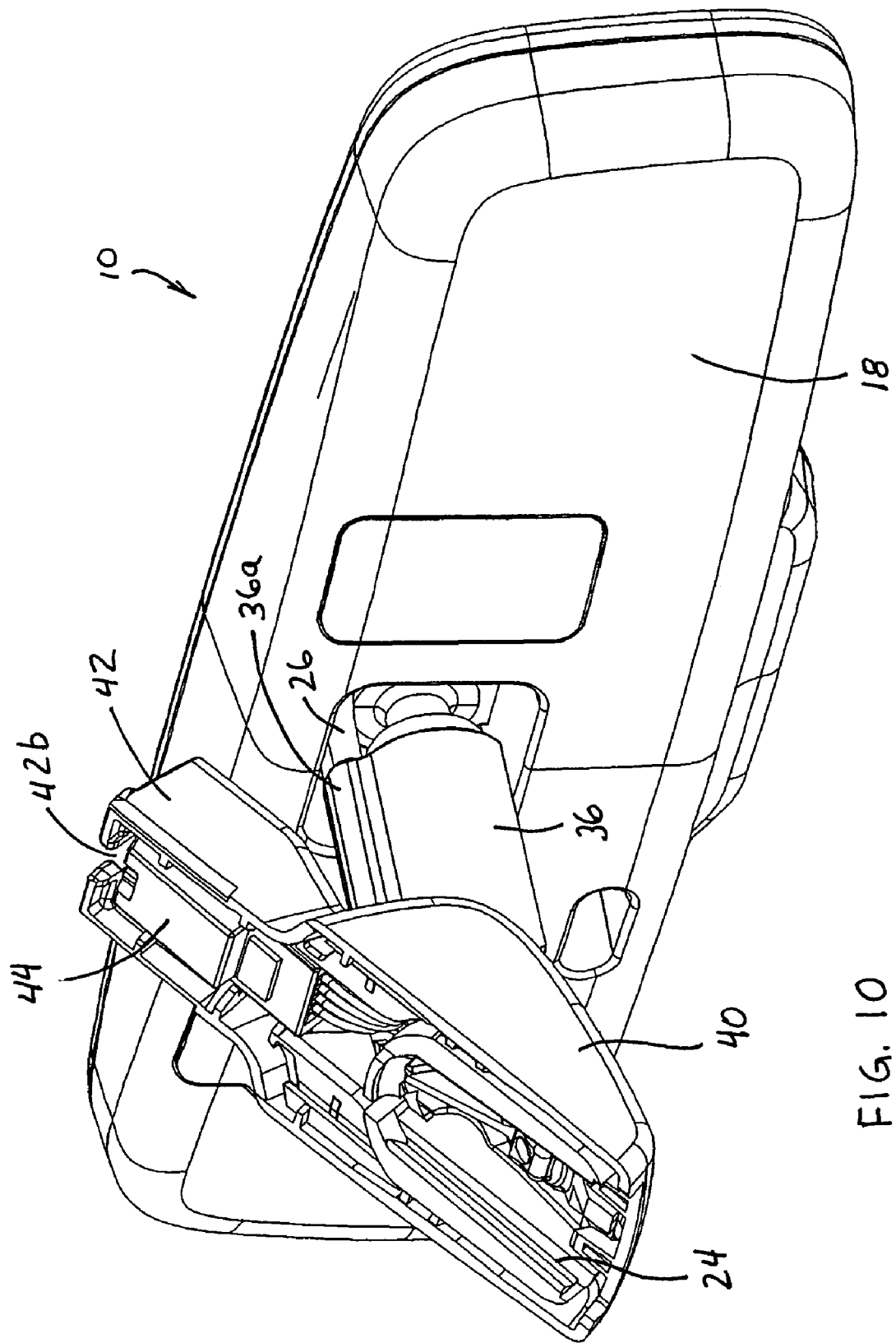
FIG. 10 is another rear perspective view of the wire management assembly of the present invention as attached to the mirror assembly.
Figure 11:
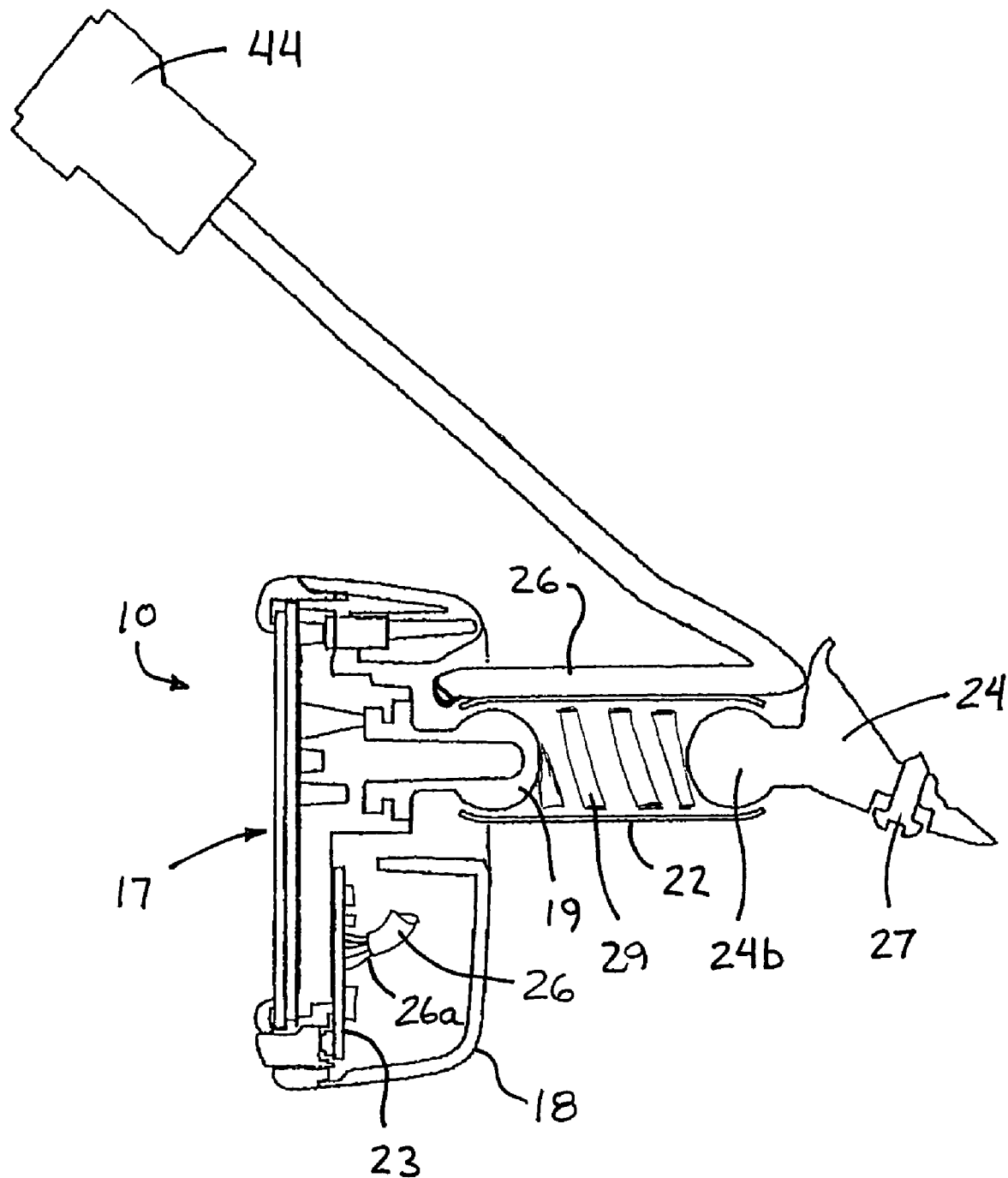
FIG. 11 is a side elevation and partial sectional view of a mirror assembly suitable for use with the wire management assembly of the present invention.

In the illustrated embodiment (and as best shown in FIG. 11), support arm 22 comprises a double socket arm with sockets or receiving portions at opposite ends of an arm or shaft portion of the support arm. For example, one receiving portion or end of support arm 22 may pivotally receive a ball member 19 of mirror assembly 10 to pivotally mount the reflective element 17 and/or casing 18 to support arm 22, while the other or opposite receiving portion pivotally receives a ball member 24b of mounting base 24. The support arm 22 includes a biasing element or spring 29 disposed in a cavity of or in the support arm and at least partially therealong to provide the desired clamping or degree of resistance of pivotal movement of the support arm relative to the ball member or members. Optionally, however, the support arm may comprise a double ball arm having a partial spherical ball member at each end, and the channel mount or base portion may include a socket or receiving portion and/or the casing or reflective element may include a socket or receiving portion for pivotally receiving the respective ball member of the support arm therein, without affecting the scope of the present invention. Optionally, the mirror assembly may include a mounting arrangement that only has one pivot joint or a single ball mounting arrangement or the like, without affecting the scope of the present invention. The reflective element may comprise an electro-optic reflective element (as shown in FIGS. 1, 2 and 6-11), such as an electrochromic reflective element or the like (whereby the support arm is preferably attached to a plastic molded attachment or back plate at the rear surface of the reflective element), or may comprise a prismatic reflective element (whereby the support arm is preferably attached to a toggle member or the like), without affecting the scope of the present invention.

Figure 2:
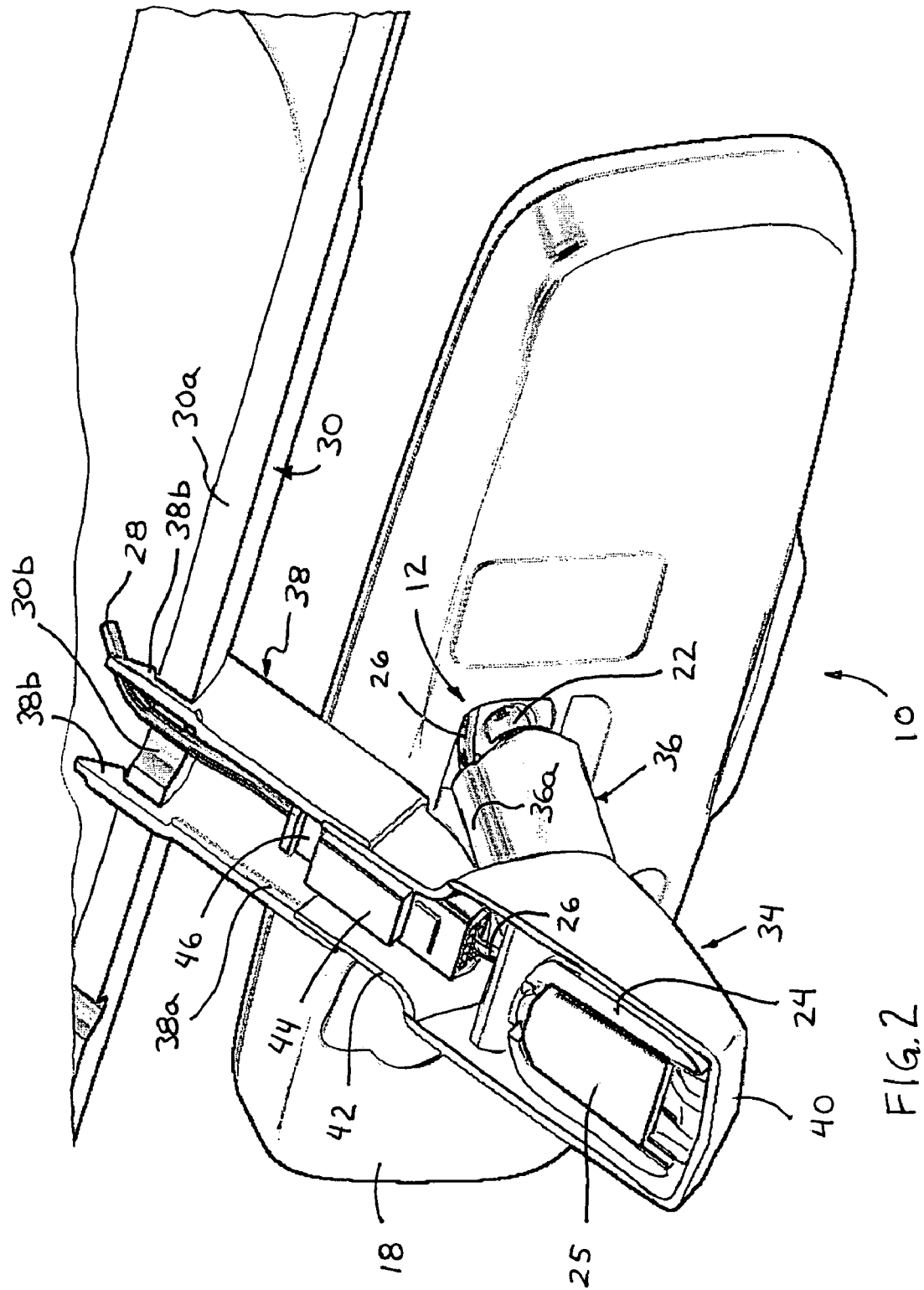
FIG. 2 is a perspective view of the interior rearview mirror assembly and mounting assembly of FIG. 1, as viewed through a windshield of the vehicle.

As can be seen with reference to FIG. 2, mounting base or channel mount 24 may slidably attach or mount to a mounting button 25 or the like, which may be adhered or bonded or otherwise attached to the interior surface of the windshield. A set screw 27 (FIG. 11) or the like may be used to secure the channel mount to the mounting button, as is known in the art. The mounting base 24 thus fixedly attaches or secures at the interior surface of the windshield, such as in a manner generally known in the art.

Wire cover or wire management assembly or system 32 includes a mounting base cover assembly or portion 34, a sleeve member 36 and a channel or guide member 38 for routing or guiding and concealing portions of the wires or cables 26, 28. Mounting base cover assembly or portion 34 is formed to cover or substantially cover mounting base 24 and to provide a wire conduit or channel or passageway from the windshield end of the sleeve member 36 (the end of the sleeve member nearer to the windshield when the wire cover assembly and mirror assembly are installed in the vehicle) to the channel or guide member 38 so that the wires or cables 26, 28 are substantially concealed and contained between the mirror casing 18 and the headliner 30 of the vehicle.

Figure 4:
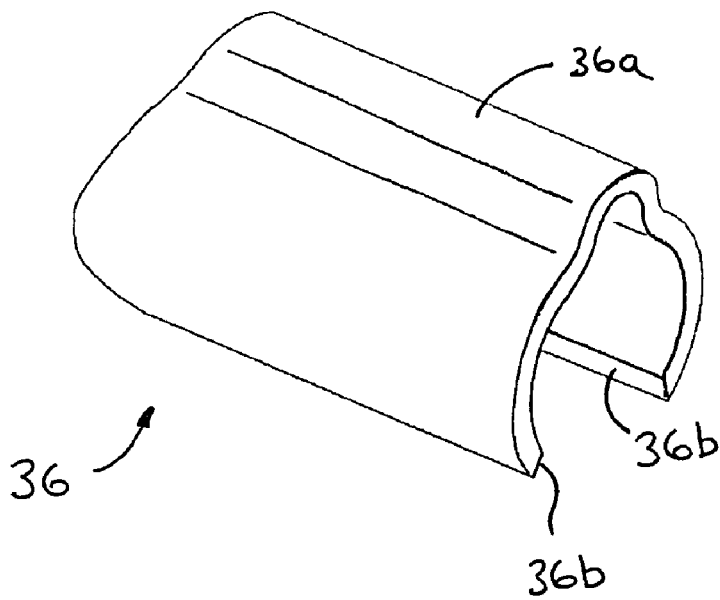
FIG. 4 is a perspective view of a sleeve member for routing a wire or cable along a mounting arm of the mounting assembly of the present invention.
Figure 5:
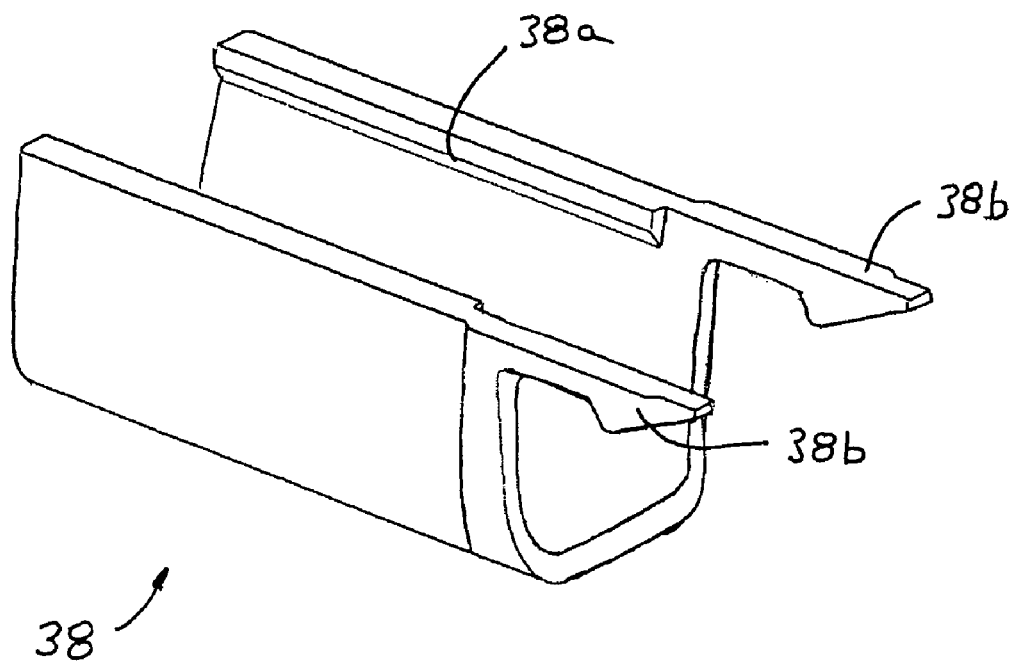
FIG. 5 is a perspective view of a channel member for routing a wire or cable along the windshield and between the headliner and the connector holder of the mounting assembly of the present invention.

As shown in FIG. 4, sleeve member 36 comprises a split sleeve that forms a generally cylindrical shaped sleeve with a raised channel portion 36a along its length. The sleeve member 36 comprises a flexible material (such as a polymeric or metallic material) and may flex to allow the split sleeve (with opposed, split or separated edges 36b ) to expand as it is pressed against the generally cylindrical shaped shaft portion of support arm 22, and may return to or toward its initial unexpanded shape to generally receive the shaft portion therein and generally clamp around the shaft portion of the support arm 22 to retain the sleeve portion on the support arm. The raised channel portion 36a provides a conduit or channel or passageway (defined by the raised channel portion and the outer surface of the support arm) for the wire 26 to pass through as the wire is routed along support arm 22. The wire 26 thus is substantially contained and concealed along the support arm 22 between mirror casing 18 and mounting base portion 24 when the sleeve member 36 is attached or snapped to the support arm with the wire or cable therewithin. The sleeve member may utilize aspects of the support structure described in U.S. patent application Ser. No. 11/328,325, filed Jan. 9, 2006,published Jun. 29, 2006 as U.S. Publication No. US-2006-0138299-A1, now U.S. Pat. No. 7,264,217; Ser. No. 10/397,599, filed Mar. 26, 2003, now U.S. Pat. No. 6,983,920; and Ser. No. 09/470,791, filed Dec. 23, 1999, now U.S. Pat. No. 6,540,193, the disclosures of which are hereby incorporated herein by reference in their entireties.

Figure 3:
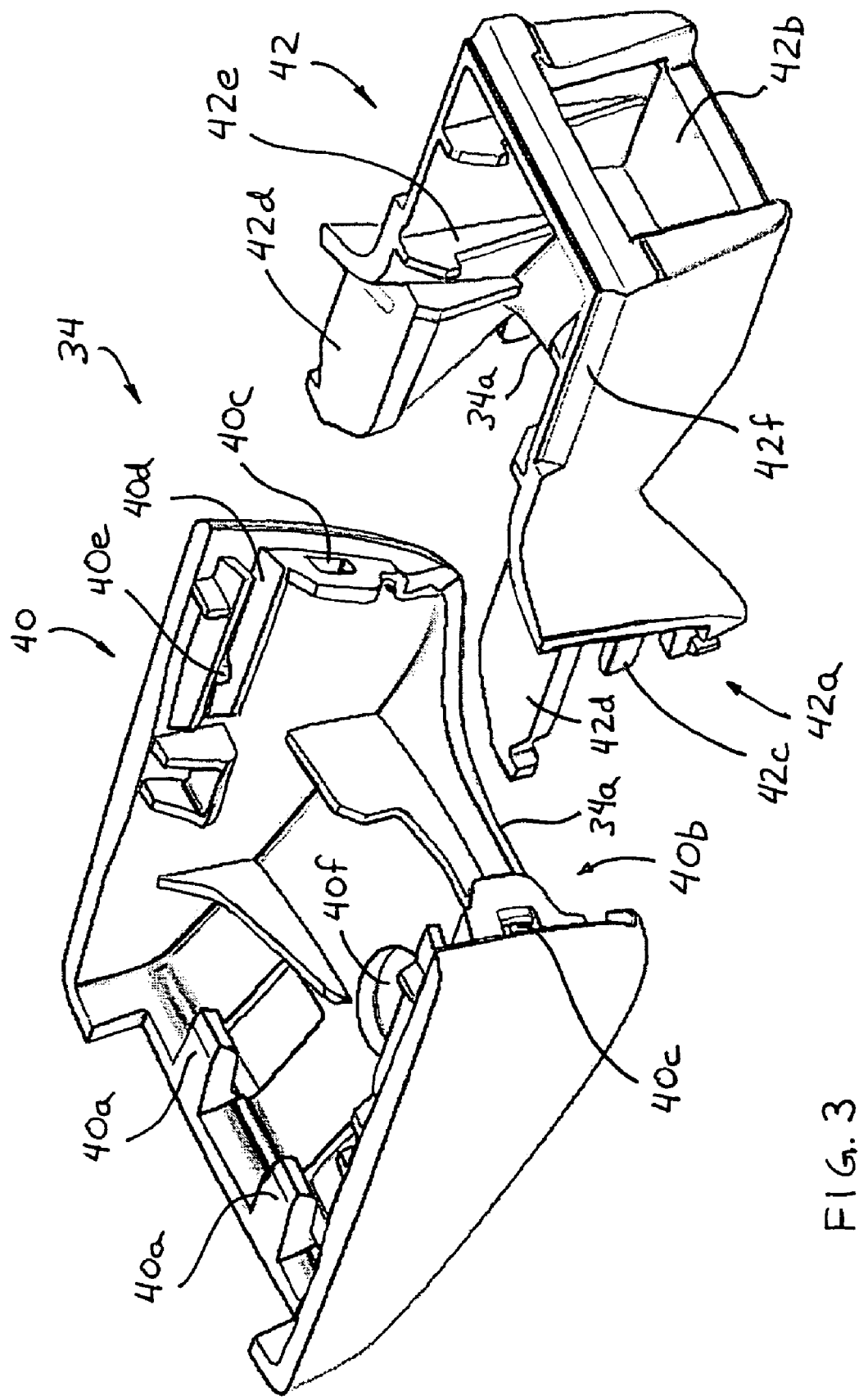
FIG. 3 is an exploded perspective view of a mounting base and connector holder of the mounting assembly of the present invention.

Optionally, and as shown in FIG. 3, mounting base cover assembly or portion 34 may comprise a lower cover portion 40 and an upper connector or upper cover portion 42, whereby the lower and upper portions 40, 42 may be snapped together or otherwise joined together about the mounting base portion 24, as discussed below. Lower cover portion 40 is formed to receive a lower portion of the channel mount 24 therein and may include one or more tabs 40a for engaging the lower portion or end of the channel mount to limit movement of the lower cover portion 40 relative to channel mount 24. An upper end or region 40b of lower cover portion 40 may be open for connecting to or joining with upper cover portion 42, as discussed below.

In the illustrated embodiment, upper cover portion 42 of mounting base cover assembly 34 is also formed to receive an upper portion of the channel mount 24 therein and may also include tabs or members or the like for engaging the upper end or region of the channel mount to limit movement of the upper cover portion 42 relative to the channel mount. Thus, when upper cover portion 42 is secured or snapped to lower cover portion 40 with channel mount 24 therewithin, the mounting base cover assembly or portion 34 is substantially fixedly mounted at the channel mount. When so mounted, the ball member 24b of the channel mount is at (and protrudes through) an opening defined in mounting base cover assembly or portion 34 (defined by the open end or edges 34a (FIG. 3) of the upper and lower cover portions), so that support arm 22 receives ball member 24b at the opening and outward from the channel mount 24 and mounting base cover assembly 34. Upper cover portion 42 further includes a generally open lower end or region 42a and an opening or passageway 42b at its upper end region for providing access to the connector 44 of mirror wire or cable 26, as discussed below.

As can be seen in FIG. 3, lower cover portion 40 may include guide apertures 40c and slots or channels 40d at or near the open end region 40b, while upper cover portion 42 may include guide posts 42c and tabs 42d at or near its open lower end region 42a, whereby the posts 42c and tabs 42d may engage the apertures 40c and channels 40d, respectively, as upper and lower cover portions 42, 40 are joined together. The tabs 42d may include lips or edges that may snap onto a raised or otherwise formed notch or protrusion 40e along channels 40d so as to substantially snap or lock the cover portions together. Accordingly, the lower cover portion 40 may be positioned at the channel mount 24 (with tabs 40a engaging notches or elements 24a at a lower end portion of the channel mount 24), and the upper cover portion 42 may be slid downward (such as in a direction that would be generally along the interior surface of the windshield when the mirror assembly is attached to the windshield) and into engagement with the upper cover portion 40, so that the upper and lower cover portions are aligned and guided together via the tabs and channels and secured together and substantially fixedly positioned at the channel mount 24 and mounting button 25.

Upper cover portion 42 may include one or more tabs or flanges 42e for securing an electrical connector 44 (FIG. 2) within upper cover portion 42 and generally at the upper open passageway 42b. For example, and as can be seen in FIG. 2, a plug or socket type connector 44 (attached to wire or cable 26) may be positioned within the upper passageway 42b and snapped or secured within upper cover portion 42, so that the pins or sockets or terminals or connecting portions of the connector 44 are accessible at the open end of the upper cover portion 42. A corresponding connector 46 (such as may be attached to vehicle wire or cable 28) may then be readily connected to the connector 44 to electrically connect the electrical accessories or circuitry of the mirror assembly to the vehicle wiring harness and electrical power. Optionally, the mirror wire or cable 26 may not have such a connector at its end, and the vehicle wire or cable may be otherwise electrically connected to the mirror wire or cable. Optionally, the mirror wire or cable may have sufficient length to extend along the windshield between the mounting base or channel mount and the vehicle headliner, whereby electrical connection between the vehicle wire harness and the mirror wire or cable may be made generally at or within the vehicle headliner.

Upper channel member 38 may connect or attach to the upper end portion of upper cover portion 42 and may conceal and house and guide the cable 28 and connector 46 between upper cover portion 42 and the headliner 30. Upper channel member 38 is a generally U-shaped channel member that may receive the upper end of upper cover portion 42 therewithin. In the illustrated embodiment, upper channel member 38 includes inwardly projecting flanges or lips 38a along its edges, whereby the channel member may be snapped over the upper cover portion 42 of mounting base cover assembly 34, and the flanges or lips 38a may be received along corresponding notches or recesses or chamfered edges 42f (FIG. 3) formed along the upper cover portion, in order to secure the channel member 38 at the upper cover portion 42. For example, the lower end region of the channel member 38 may be pressed toward the windshield and may flex to expand and thus receive the upper end region of the upper cover portion 42 as the channel member is moved toward the windshield and into engagement with the upper cover portion 42 (or the channel member 38 may be slide along the windshield over the upper end region of the upper cover portion). As the upper channel member is moved to or substantially near or against the interior surface of the windshield, the tabs or lips 38a may be received within the recesses 42f to substantially limit detachment of the channel member 38 from the upper cover portion 42.

In the illustrated embodiment, the upper channel member 38 includes a pair of tabs or arms 38b extending from its upper or opposite end for attaching or connecting upper channel member 38 to the headliner 30 of the vehicle. As shown in FIGS. 1 and 2, tabs 38b may extend between the headliner 30 and the interior surface of the windshield, and may engage or attach to a lip 30a of the headliner to limit movement of the upper channel member 38 relative to the headliner 30. As can be seen in FIG. 2, a notch or groove 30b may be formed in the lip 30a of headliner 30 to facilitate routing of wire 28 from the ceiling region of the headliner to the windshield region below the headliner. Although shown and described as being connectable to a headliner at a ceiling portion of a vehicle, the channel member may otherwise connect to a console or other header or the like at an upper region of the vehicle windshield, without affecting the scope of the present invention. Optionally, the channel member may utilize aspects of the wire covers described in U.S. Pat. No. 4,930,742, which is hereby incorporated herein by reference in its entirety.

Figure 6:
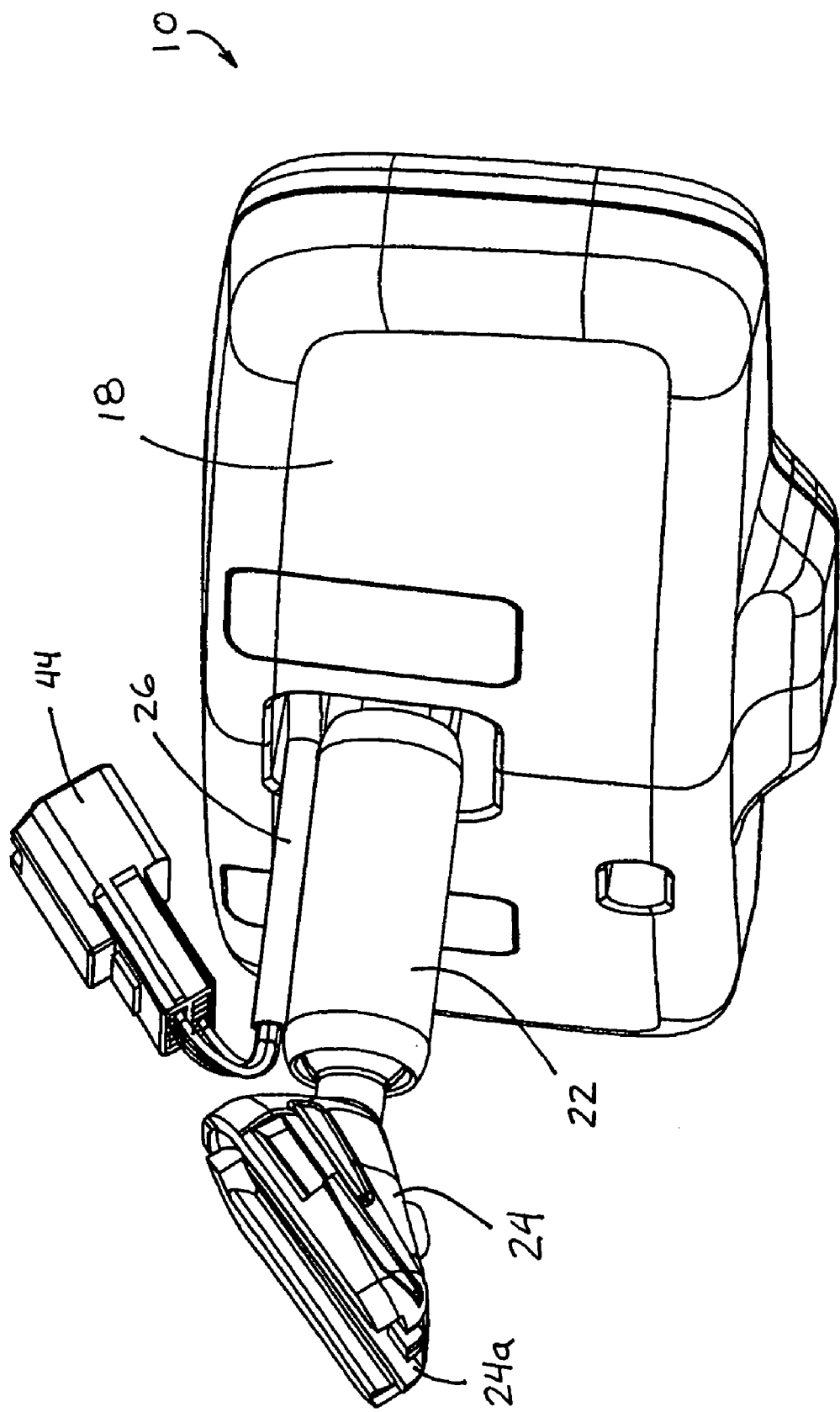
FIG. 6 is a perspective view of a mirror assembly suitable for use with the wire management assembly of the present invention.

Accordingly, the wire cover assembly or system 32 provides a substantial containment and guide element for the wires or cables between the mirror casing 18 and the vehicle headliner 30. Thus, a mirror assembly 10 (such as shown in FIG. 6) may be provided that includes the double ball mounting arrangement or structure 12 and a includes a reflective element and housing or casing, with a circuit element 23 installed or mounted therein. The circuit element includes the mirror circuitry (such as circuitry from controlling the dimming of the electrochromic mirror or circuitry for lights or other controls or accessories of the mirror assembly, such as discussed below) and includes an electrical wire or lead or mirror wire harness 26 extending therefrom. The electrical lead or mirror wire harness may comprise a ribbon cable or wire bundle or the like and may be connected to the circuit board via a suitable connector. Preferably, and as can be seen in FIG. 11, the mirror wire harness 26 has its terminals or ends of the individual wires 26a soldered or otherwise secured to the circuit element or board 23, such that the circuit board and wire harness or lead 26 may be provided as a pre-fabricated unit that is supplied to the mirror manufacturer for incorporation into the mirror assembly. Thus, the mirror manufacturer may purchase a circuit board and wire harness unit (such as a unit having a wire harness extending about 7 to 10 inches from the circuit board, or the wire harness may be shorter or longer depending on the particular vehicle at which the mirror assembly will be installed) and may readily install the unit at the mirror reflective element (or back plate thereof), with the mirror wire harness extending through the rear of the mirror casing, such as at a central opening of the mirror casing and through which the ball member of the reflective element or back plate may protrude (as can be seen in FIG. 11) for pivotally connecting to the support arm.

The electrical wire or lead may be selected so as to be sufficiently long enough to route through the rear of the mirror casing (such as through a generally central opening at the mirror casing through which the ball member 19 may protrude or partially protrude or through which the support arm 22 may protrude to pivotally attach the ball member 19) and along the mirror support arm and to the upper wire cover at the windshield, whereby a connector at the end of the mirror wire harness opposite the circuit board may be connected to a vehicle wire or cable from the vehicle headliner. Optionally, and desirably, and as shown in FIG. 11, the mirror electrical wire harness or cable 26 may be sufficiently long enough to extend upward generally along the vehicle windshield to the headliner of the vehicle, whereby electrical connection between the vehicle wire harness and the mirror wire harness may be made at or within the vehicle headliner. In such an application, the upper cover portion of the mounting base cover assembly or portion would route the mirror wire harness therethrough but would not secure a wire connector at its upper end.

Figure 7:
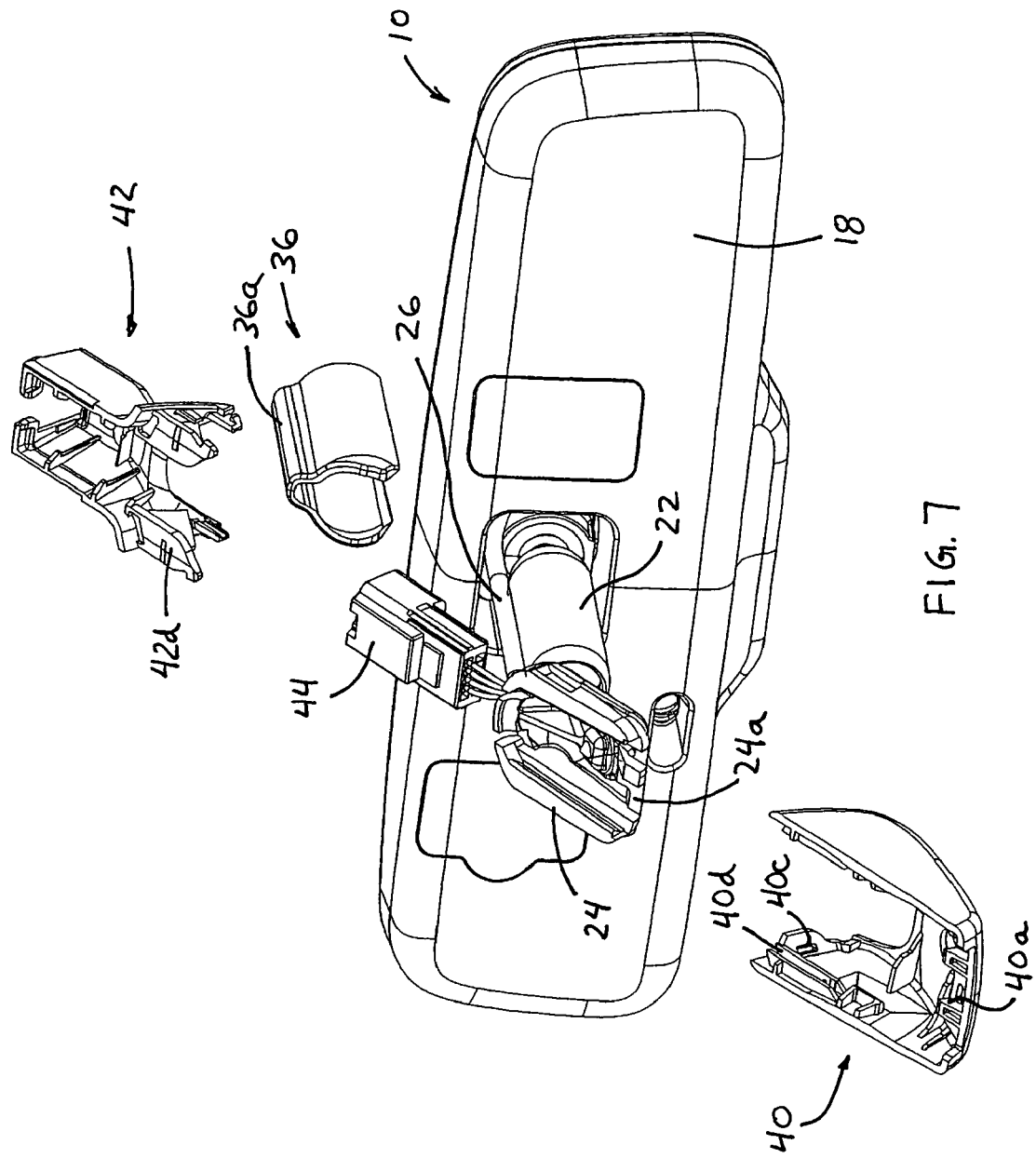
FIG. 7 is an exploded perspective view of the wire management assembly of the present invention at the mirror assembly of FIG. 6.
Figure 8:
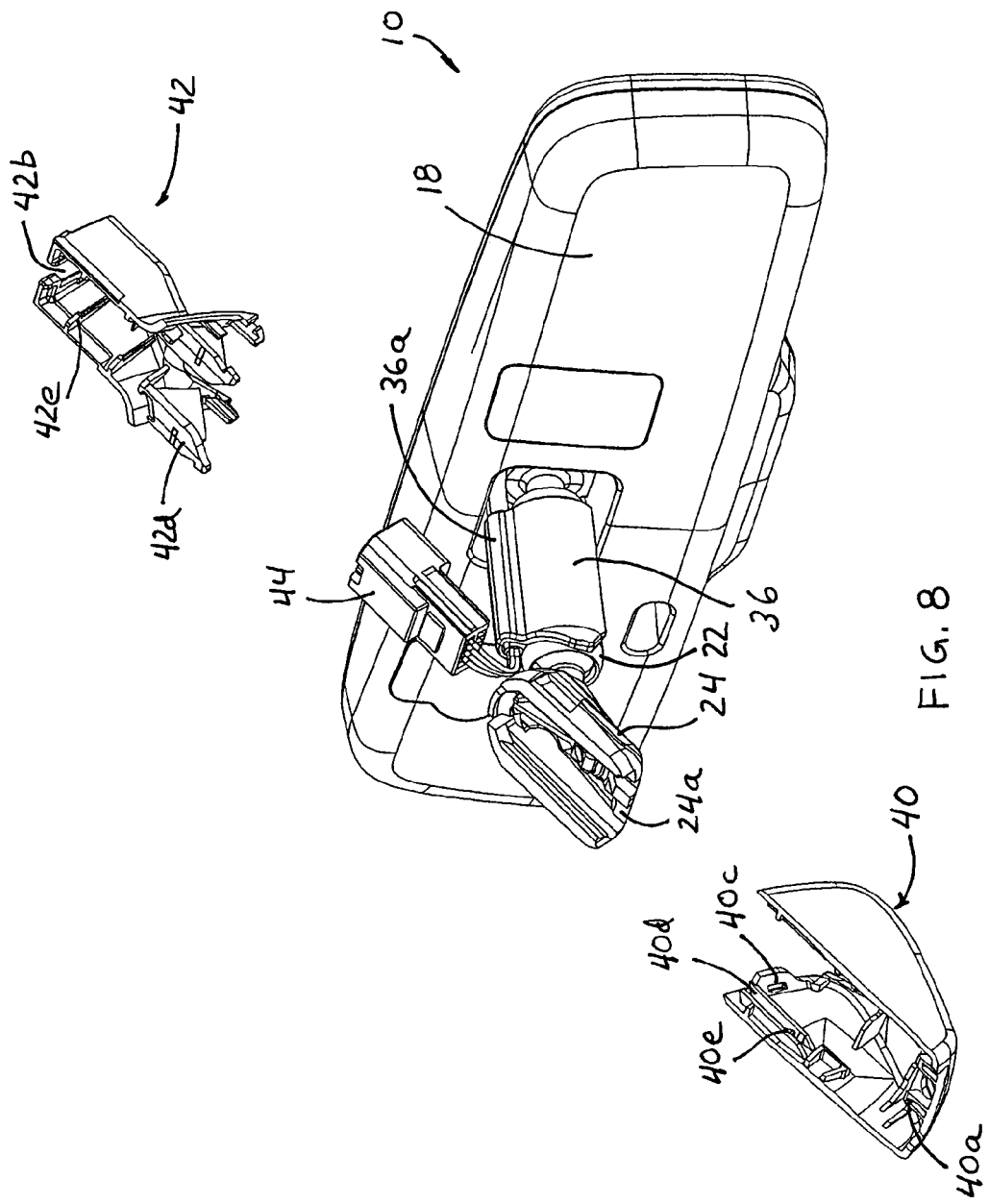
FIG. 8 is another exploded perspective view of the wire management assembly at the mirror assembly, with the arm sleeve or wire channel attached to the support arm of the mirror assembly.

Optionally, the mirror assembly (including the casing, reflective element and mounting arrangement) may be provided to the vehicle assembly plant with the sleeve member and the mounting base cover assembly already attached to the support arm and channel mount, respectively, and with the mirror wire already routed along and through the sleeve member and the mounting base cover assembly. Optionally, and as shown in FIG. 7, the mirror assembly 10 may be provided with the wire or lead 26 extending from the rear of the mirror casing and generally along the support arm 22. The sleeve member 36 may be readily snapped or attached to the support arm 22 (as shown in FIG. 8), either before or after the mirror assembly is attached to or mounted to the mounting button at the vehicle windshield. An operator at the assembly plant may mount the channel mount to a mounting button on the interior surface of the windshield (and may secure the channel mount to the mounting button via a set screw 27 or the like, which may be accessed through an opening 40f in lower cover portion 40).

Optionally, the mirror assembly may be provided without the mounting base cover assembly attached thereto, whereby the operator may first attach the channel mount of the mirror assembly to the mounting button at the vehicle windshield. After the mirror assembly is mounted at the vehicle windshield, the operator at the manufacturing plant may snap (or otherwise attach) the lower cover portion 40 at the mounting base or channel mount 24 (such as via sliding the lower cover portion in a direction generally along the windshield and onto the channel mount, whereby the tabs 40a of the lower cover portion 40 may engage and be received in corresponding notches 24a at a lower end of the mounting base or channel mount 24 (as can be seen with reference to FIG. 8).

The upper cover portion 42 may be snapped (or otherwise attached) at the upper end of the channel mount 24 and to the upper end of the lower cover portion 40, such as by sliding or moving the upper cover portion 42 downward generally along the windshield until the upper cover portion engages and attaches or snaps to the lower cover portion. As the upper cover portion is positioned at the mounting base or channel mount 24, the connector 44 of the mirror wire or lead 26 may be received in the cavity of the upper cover portion and retained therein via tabs 42e, whereby the connector end or plug or socket of the connector 44 is at the upper opening 42b of upper cover portion 42. As can be seen in FIGS. 7-10, the upper end of the upper cover portion may be slotted so as to allow for insertion of the mirror cable into the upper cover portion without having to thread the mirror cable through an opening at the end of the upper cover portion, such as for applications where the mirror wire harness may extend upward from the mounting base cover assembly and toward or to the vehicle headliner. The upper cover portion 42 is moved along the windshield toward the channel mount until the tabs 42d of upper cover portion 42 engage the channels 40d of lower cover portion 40 and further engage the protrusions 40e of channels 40d of lower cover portion 40 to retain or secure or snap the upper cover portion to the lower cover portion.

Figure 9:
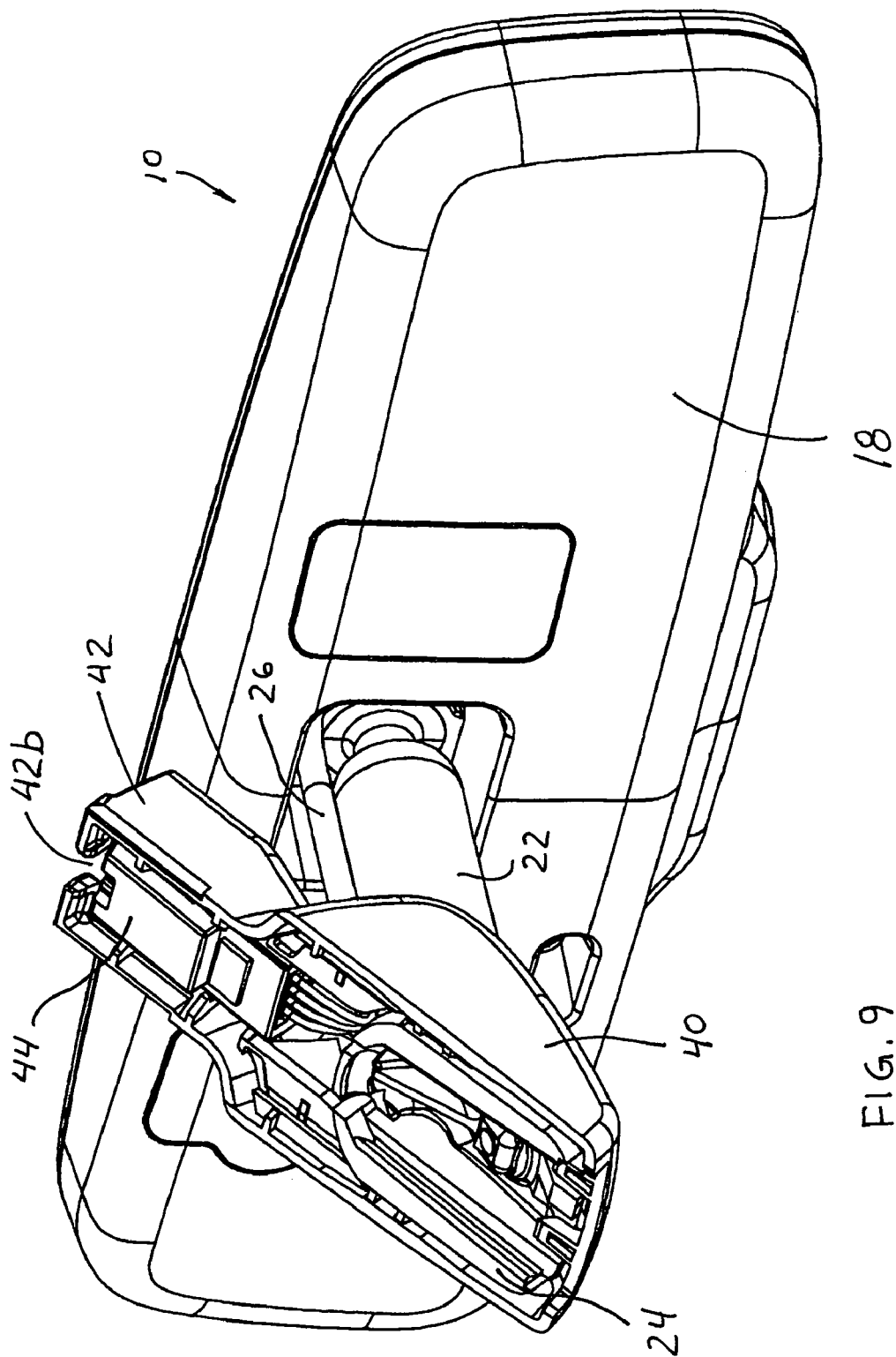
FIG. 9 is a rear perspective view of the wire management assembly of the present invention as attached to the mirror assembly of FIG. 6, with the arm sleeve or wire channel removed therefrom.

When the mounting base cover assembly is assembled (such as shown in FIGS. 9 and 10), the upper cover portion 42 is secured to the lower cover portion 40, which is substantially secured relative to channel mount 24 so that relative movement between the cover portions and the channel mount is limited or substantially precluded. The electrical mirror wire or lead 26 is also substantially retained along the support arm 22 (via the cover or sleeve element 36), and the connector 44 is substantially retained or secured within the upper cover portion 42, such that relative movement between the upper cover portion and the electrical connector 44 is limited or substantially precluded. The present invention thus provides substantial containment and management of the electrical wires or leads from the mirror and substantially conceals them so as to provide substantially covert routing of the wires or leads from the mirror casing, along the exterior or outer surface of the support arm and channel mount and toward or to the headliner of the vehicle. Because the mirror wire or cable is routed along the exterior surface of the support arm and channel mount, the wire management or wire cover assembly of the present invention may be readily installed/attached to cover the wires and conceal the wires from view, without having to route or thread the wires through a hollow support arm and/or through other hollow mounting portions or elements of the mirror assembly, and thus avoiding the costs and complexities associated with such systems or assemblies. Thus, using advantages of the present invention, there is no need to pre-thread or pre-pass the wire through, for example, the crowded central core of the mirror support arm/channel/tube, that is often occupied with a spring, such as described in U.S. Pat. No. 5,984,482, which is hereby incorporated herein by reference in its entirety.

The present invention thus provides a wire management/concealment system that is attached at the exterior of the support arm and channel mount to substantially cover the wire along the support arm and at and above the mounting ball or base portion or channel mount of the mirror mounting assembly or structure. The two plastic cover portions may be readily snapped to one another to secure the cover portions at the channel mount to conceal the wires therein, while also substantially fixedly positioning the connector of the mirror wires so as to ease electrical connection to the mirror wire connector with the vehicle wire and connector extending from the headliner of the vehicle.

After the mirror assembly is installed at the vehicle windshield (and optionally after the cover portions are attached to one another and/or to the channel mount), the vehicle wire harness may be readily connected to the connector end of the mirror wire harness at the upper end of the upper cover portion (or at the vehicle headliner), and optionally the channel member may be readily installed at the windshield and headliner and upper cover portion, so as to substantially contain and conceal the vehicle wire harness (or the upper end of the mirror wire harness) between the mounting base cover assembly and the vehicle headliner. For example, the vehicle wire harness or cable 28 from the headliner 30 may be positioned along the windshield and connected to (such as via a plug and socket connection) the connector 44 at the upper cover portion 42. The channel member 38 may then be positioned at the windshield and the tabs 38b of the channel member 38 may be inserted into the headliner region to substantially secure the upper end of the channel member 38 at the headliner 30. When so secured or engaged, the channel member 38 may be pivoted toward the windshield so that the lower end of the channel member 38 receives the upper end of the upper cover portion (and so that the wire 28 and connector 46 are positioned along the channel member 38) and snaps or secures the channel member to the upper cover portion (with the tabs 38b engaging the recesses or chamfered edges 42f to secure the channel member 38 to the upper cover portion 42 of the mounting base cover assembly).

Optionally, the wire cover assembly or system 32 may be readily assembled at the vehicle assembly plant after the mirror assembly is installed at or attached to the vehicle windshield, while facilitating enhanced connection of the vehicle wires or cables to the mirror wires or cables. For example, the mirror assembly 10 (including the reflective element, casing 18, support arm 22, channel mount 24 and mirror wire 26 and connector 44) may be secured at the mounting button 25 at the interior surface of the vehicle windshield. The wire 26 may be positioned along the support arm 22 and the sleeve member 36 may be readily snapped over the support arm 22 and wire 26. The lower cover portion 40 of the mounting base cover portion 34 may be positioned at the channel mount 24 and the upper cover portion 42 and the wire 26 and connector 44 may be positioned at and partially in the upper cover portion 42. The upper cover portion 42 may then be moved or slid generally along the windshield and into connection with the lower cover portion, whereby the wire 26 extends from the sleeve member 36 and into the upper cover portion 42, where the connecting end of the connector is positioned at the open upper end region of the upper cover portion 42.

The wire cover or wire management assembly of the present invention thus provides a cover or routing assembly or system that substantially continuously covers and guides and manages the wires between the mirror casing and the vehicle headliner and that eases the electrical connection of the vehicle wiring and power supply to the electrical accessories and circuitry of the mirror assembly. The wire cover elements or portions of the wire management assembly of the present invention interconnect and/or cooperate to substantially shield and conceal the wire harness or harnesses between the rear of the mirror casing and the headliner of the vehicle. The mirror assembly thus may be readily attached to the mirror mounting button and the wires may be readily routed along the support arm and along the windshield, whereby the wire cover assembly may be readily assembled at the mirror assembly and windshield to substantially contain the wires along the support arm and along the interior surface of the windshield. The channel member and the mounting base cover assembly of the wire cover assembly or system may be generally hollow members with open sides along the windshield (whereby the windshield may include a blackened or darkened frit layer or the like in those regions to conceal the wiring and the wire cover assembly) or may have enclosed sides or surfaces along the windshield to substantially conceal the wires from viewing through the windshield from outside the vehicle cabin. The mounting base cover assembly (including the upper and lower cover portions) and the sleeve member or element or portion may be provided to the vehicle assembly plant as part of the mirror assembly, and the upper sleeve portion or cover portion or channel member or portion may be provided as a separate part for an operator at the vehicle assembly plant to attach to the upper cover portion and/or the vehicle headliner after the mirror assembly is mounted at the vehicle windshield.

The wire cover assembly or system of the present invention thus may provide a cover or routing element for wires extending from the mirror casing, and, because the wire cover assembly may snap to and/or around the support arm and channel mount of the mirror assembly, may be implemented with a common mirror mounting arrangement. The common mirror mounting arrangement (including the support arm and channel mount) may be used for baseline mirror assemblies (which may not include any electrical accessories or circuitry and thus any mirror wires) and mirror assemblies with electrical content, so that the common mirror mounting arrangement may be implemented for all or substantially all interior rearview mirror assemblies of a particular vehicle line. Because the wire cover or wire management assembly may readily attach to a channel mount and support arm, the wire cover assembly may be readily implemented with different types of mounting arrangements, such as a mounting arrangement and support arm for a prismatic reflective element mirror assembly or a mounting arrangement and support arm for an electro-optic reflective element mirror assembly. The cover or wire management assembly thus may be readily positioned at or attached to a common mirror mounting arrangement or various mirror mounting arrangements and only for those vehicles and mirror assemblies which include the appropriate electrical content and wiring.

Further, the same or a common wire cover assembly may be used for different wiring applications, such as for a mirror wire harness that ends at the upper cover portion of the mounting base cover assembly (for applications where the vehicle wire harness extends down from the vehicle headliner) or for a mirror wire harness that extends up to or near to the vehicle headliner (for applications where the electrical connection may be made at or within the vehicle headliner). The wire cover assembly or wire management assembly of the present invention thus provides increased flexibility over known wire handling systems, and is readily adaptable or attachable to various mirror assemblies to substantially or wholly contain/conceal the wire harnesses of the mirror and/or vehicle as they are routed between the rear of the mirror casing and the vehicle headliner.

Because the mounting base cover assembly is substantially fixedly secured to the mounting base or channel mount and, thus, is substantially fixedly secured with respect to the vehicle when the mirror assembly and wire cover assembly are installed in the vehicle, the mounting base cover assembly may be suitable for housing one or more electronic accessories or circuitry or the like. For example, the lower cover portion of the mounting base cover assembly may house or contain compass circuitry, including compass sensors and the like, and may include a compass-on-a-chip, such as by utilizing aspects described in U.S. patent application Ser. No. 11/021,065, filed Dec. 23, 2004 by McCabe et al. for ELECTRO-OPTIC MIRROR CELL, now U.S. Pat. No. 7,255,451; Ser. No. 11/201,661, filed Aug. 11, 2005 by DeWard et al. for ACCESSORY MODULE FOR VEHICLE; and/or Ser. No. 11/226,628, filed Sep. 14, 2005 by Karner et al., which are hereby incorporated herein by reference in their entireties. Optionally, the lower cover portion may include other circuitry or accessories or the like, such as an EC driver-on-a-chip (such as by utilizing aspects described in U.S. patent application Ser. No. 11/201,661, filed Aug. 11, 2005 by DeWard et al. for ACCESSORY MODULE FOR VEHICLE; and/or Ser. No. 11/226,628, filed Sep. 14, 2005 by Karner et al., which are hereby incorporated herein by reference in their entireties) or the like, without affecting the scope of the present invention. Other circuitry or accessories or the like may be located in the base cover portion, and may be connected to the mirror wire and/or to the mirror wire connector so that the circuitry or accessory or the like may be readily connected to the vehicle wire in the manner described above. The circuitry or accessory at the mounting base covet assembly may also or otherwise be electrically connected to circuitry or the like within the mirror casing (whereby a wire may be routed from the mounting base cover assembly to the mirror casing and may be contained or routed within and along the sleeve member of the wire cover assembly), without affecting the scope of the present invention.

Optionally, the mirror assembly may include one or more user inputs 48 (FIG. 1) for controlling or activating/deactivating one or more electrical accessories or devices of or associated with the mirror assembly. The mirror assembly may comprise any type of switches or buttons, such as touch or proximity sensing switches, such as touch or proximity switches of the types described in PCT Application No. PCT/US03/40611, filed Dec. 19, 2003 by Donnelly Corporation for ACCESSORY SYSTEM FOR VEHICLE; and/or U.S. Pat. Nos. 6,001,486; 6,310,611; 6,320,282; and 6,627,918; and/or U.S. patent application Ser. No. 09/817,874, filed Mar. 26, 2001 by Quist et al. for INTERACTIVE AUTOMOTIVE REARVISION SYSTEM, now U.S. Pat. No. 7,224,324; Ser. No. 10/956,749, filed Oct. 1, 2004 by Schofield et al. for MIRROR REFLECTIVE ELEMENT ASSEMBLY INCLUDING ELECTRONIC COMPONENT, now U.S. Pat. No. 7,446,924; Ser, No. 10/933,842, filed Sep. 3, 2004 by Kulas et al. for INTERIOR REARVIEW MIRROR ASSEMBLY, now U.S. Pat. No. 7,249,860; Ser. No. 11/021,065, filed Dec. 23, 2004, now U.S. Pat. No. 7,255,451; and/or Ser. No. 11/140,396, filed May 27, 2005, now U.S. Pat. No. 7,360,932; and/or U.S. provisional application, Ser. No. 60/563,342, filed Apr. 19, 2004 by Bareman et al. for METHOD OF MANUFACTURING ELECTRO-OPTIC MIRROR CELL, which are hereby incorporated herein by reference in their entireties, or the inputs may comprise other types of buttons or switches, such as those described in U.S. patent application Ser. No. 11/029,695, filed Jan. 5, 2005, now U.S. Pat. No. 7,253,723; and/or Ser. No. 11/451,639, filed Jun. 13, 2006; and/or U.S. provisional applications, Ser. No. 60/553,517, filed Mar. 16, 2004; Ser. No. 60/535,559, filed Jan. 9, 2004; Ser. No. 60/690,401, flied Jun. 14, 2005; and Ser. No. 60/719,482, filed Sep. 22, 2005; and Ser. No. 60/749,423, filed Dec. 12, 2005, which are hereby incorporated herein by reference in their entireties, or such as fabric-made position detectors, such as those described in U.S. Pat. Nos. 6,504,531; 6,501,465; 6,492,980; 6,452,479; 6,437,258; and 6,369,804, which are hereby incorporated herein by reference in their entireties. For example, the inputs may comprise a touch or proximity sensor of the types commercially available from TouchSensor Technologies, LLC of Wheaton, Ill. The touch or proximity sensor may be operable to generate an electric field and to detect the presence of a conductive mass entering the field.

When a voltage is applied to the sensor, the sensor generates the electric field, which emanates though any dielectric material, such as plastic or the like, at the sensor. When a conductive mass (such as a person's finger or the like, or metal or the like) enters the electric field, the sensor may detect a change in the field and may indicate such a detection. Other types of switches or buttons or inputs or sensors may be incorporated to provide the desired function, without affecting the scope of the present invention.

Optionally, the user inputs or buttons may comprise user inputs for a garage door opening system, such as a vehicle based garage door opening system of the types described in U.S. Pat. Nos. 6,396,408; 6,362,771; and 5,798,688, and/or U.S. patent application Ser. No. 10/770,736, filed Feb. 3, 2004, now U.S. Pat. No. 7,023,322; and/or U.S. provisional applications, Ser. No. 60/502,806, filed Sep. 12, 2003 by Taylor et al. for GARAGE DOOR OPENING SYSTEM FOR VEHICLE; and Ser. No. 60/444,726, filed Feb. 4, 2003 by Baumgardner et al. for GARAGE DOOR OPENING SYSTEM FOR VEHICLE, which are hereby incorporated herein by reference in their entireties. The user inputs may also or otherwise function to activate and deactivate a display or function or accessory, and/or may activate/deactivate and/or commence a calibration of a compass system of the mirror assembly and/or vehicle. The compass system may include compass sensors and circuitry within the mirror assembly or within a compass pod or module at or near or associated with the mirror assembly. Optionally, the user inputs may also or otherwise comprise user inputs for a telematics system of the vehicle (such as an ONSTAR® system as found in General Motors vehicles and such as described in U.S. Pat. Nos. 4,862,594; 4,937,945; 5,131,154; 5,255,442; 5,632,092; 5,798,688; 5,971,552; 5,924,212; 6,243,003; 6,278,377; and 6,420,975; 6,477,464; and/or 6,678,614; and/or U.S. patent application Ser. No. 10/456,599,filed Jun. 6, 2003 by Weller et al. for INTERIOR REARVEW MIRROR SYSTEM WITH COMPASS, now U.S. Pat. No. 7,004,593; Ser. No. 10/645,762, filed Aug. 20, 2003 by Taylor et al. for VEHICLE NAVIGATION SYSTEM FOR USE WITH A TELEMATICS SYSTEM, now U.S. Pat. No. 7,167,796; Ser. No. 10/964,512, filed Oct. 13, 2004, now U.S. Pat. No. 7,308,341; Ser. No. 10/422,378,filed Apr. 24, 2003 by Schofield for IMAGING SYSTEM FOR VEHICLE, now U.S. Pat. No. 6,946,978; and Ser. No. 10/529,715, filed Mar. 30, 2005, published on May 25, 2006 as U.S. Pat. Publication No. US-2006-0109996-A1; and/or PCT Application No. PCT/US03/40611, filed Dec. 19, 2003 by Donnelly Corporation et al. for ACCESSORY SYSTEM FOR VEHICLE, and/or PCT Application No. PCT/US03/308877, filed Oct. 1, 2003 by Donnelly Corp. for MICROPHONE SYSTEM FOR VEHICLE, which are all hereby incorporated herein by reference in their entireties).

Optionally, the finish or color of the mirror casing and/or bezel and/or reflective element and/or support arm and/or user inputs and/or wire cover assembly (or particular components or elements thereof) may be customized to provide a preferred or desired or customized appearance to the mirror assembly, such as by utilizing aspects described in U.S. patent application Ser. No. 10/556,754, filed Nov. 15, 2005, now U.S. Pat. No. 7,289,037; Ser. No. 11/226,628, filed Sep. 14, 2005 by Karner et al.; Ser. No. 11/021,065, filed Dec. 23, 2004, now U.S. Pat. No. 7,255,451; and/or Ser. No. 11/451,639, filed Jun. 13, 2006; U.S. provisional applications, Ser. No. 60/535,559, filed Jan. 9, 2004; Ser. No. 60/690,401, filed Jun. 14, 2005; and Ser. No. 60/719,482, filed Sep. 22, 2005; and Ser. No. 60/749,423, filed Dec. 12, 2005; and/or PCT Application No. PCT/US04/15424, filed May 18, 2004, which are all hereby incorporated herein by reference in their entireties. Optionally, one or more components of the mirror assembly and wire cover assembly may have one color or texture or color/pattern scheme, while one or more other components of the mirror assembly and wire cover assembly may have another color or texture or color/pattern scheme, depending on the desired or appropriate or customized overall appearance of the mirror assembly and the wire cover assembly.

In the illustrated embodiment, the reflective element comprises an electro-optic or electrochromic reflective element assembly or cell. The electrochromic reflective element assembly of the electrochromic mirror assembly may utilize the principles disclosed in commonly assigned U.S. Pat Nos. 6,690,298; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference in their entireties, and/or as disclosed in the following publications: N. R. Lynam, "Electrochromic Automotive Day/Night Mirrors", *SAE Technical Paper Series* 870636 (1987); N. R. Lynam, "Smart Windows for Automobiles", *SAE Technical Paper Series* 900419 (1990); N. R. Lynam and A. Agrawal, "Automotive Applications of Chromogenic Materials", *Large Area Chromogenics: Materials and Devices for Transmittance Control*, C. M. Lampert and C. G. Granquist, EDS., Optical Engineering Press, Washington (1990), which are hereby incorporated by reference herein in their entireties; and/or as described in U.S. patent application Ser. No. 10/054,633, filed Jan. 22, 2002, now U.S. Pat. No. 7,195.381, which is hereby incorporated herein by reference in its entirety.

Optionally, the electrochromic circuitry and/or a glare sensor (such as a rearward facing glare sensor that receives light from rearward of the mirror assembly and vehicle through a port or opening along the casing and/or bezel portion and/or reflective element of the mirror assembly) and circuitry and/or an ambient light sensor and circuitry may be provided on one or more circuit boards of the mirror assembly. The mirror assembly may include one or more other displays, such as the types disclosed in U.S. Pat. Nos. 5,530,240 and/or 6,329,925, which are hereby incorporated herein by reference in their entireties, and/or display-on-demand transflective type displays, such as the types disclosed in U.S. Pat. Nos. 6,690,268; 5,668,663 and/or 5,724,187, and/or in U.S. patent application Ser. No. 10/054,633, filed Jan. 22, 2002 by Lynam et al. for VEHICULAR LIGHTING SYSTEM, now U.S. Pat. No. 7,195.381; Ser. No. 10/528,269, filed Mar. 17, 2005, now U.S. Pat. No. 7,274,501; Ser. No. 10/533,762, filed May 4, 2005, now U.S. Pat. No. 7,184,190; Ser. No. 10/538,724, filed Jun. 13, 2005 by Hutzel et al. for ACCESSORY SYSTEM FOR VEHICLE; Ser. No. 11/021,065, filed Dec. 23, 2004 by McCabe et al. for ELECTRO-OPTIC MIRROR CELL, now U.S. Pat. No. 7,255,451; and/or Ser. No. 11/226,628, filed Sep. 14, 2005 by Karner et al.; PCT Application No. PCT/US03/29776, filed Sep. 9, 2003 by Donnelly Corp. et al. for MIRROR REFLECTIVE ELEMENT ASSEMBLY; PCT Application No. PCT/US03/35381, filed Nov. 5, 2003 by Donnelly Corp. et al. for ELECTRO-OPTIC REFLECTIVE ELEMENT ASSEMBLY; and/or PCT Application No. PCT/US03/40611, filed Dec. 19, 2003 by Donnelly Corp. et al. for ACCESSORY SYSTEM FOR VEHICLE, which are all hereby incorporated herein by reference in their entireties.

Optionally, the mirror assembly may comprise a prismatic mirror assembly, such as a prismatic mirror assembly utilizing aspects described in U.S. Pat. Nos. 6,318,870; 6,598,980; 5,327,288; 4,948,242; 4,826,289; 4,436,371; and 4,435,042; and PCT Application No. PCT /US04/015424, filed May 18, 2004 by Donnelly Corporation et al. for MIRROR ASSEMBLY FOR VEHICLE; and U.S. patent application Ser. No. 10/933,842, filed Sep. 3, 2004, now U.S. Pat. No. 7,249,860; and Ser. No. 10/556,754, filed Nov. 15, 2005, now U.S. Pat. No. 7,289,037, which are hereby incorporated herein by reference in their entireties. Optionally, the prismatic reflective element may comprise a conventional prismatic reflective element or prism, or may comprise a prismatic reflective element of the types described in PCT Application No. PCT/US03/29776, filed Sep. 19, 2003 by Donnelly Corp. et al. for MIRROR REFLECTIVE ELEMENT ASSEMBLY; U.S. patent application Ser. No. 10/709,434, filed May 5, 2004 by Lynam for MIRROR REFLECTIVE ELEMENT, now U.S. Pat. No. 7,420,756; Ser. No. 10/933,842, filed Sep. 3, 2004 by Kulas et al. for INTERIOR REARVIEW MIRROR ASSEMBLY, now U.S. Pat. No. 7,249,860; Ser. No. 11/021,065, filed Dec. 23, 2004 by McCabe et al. for ELECTRO-OPTIC MIRROR CELL, now U.S. Pat. No. 7,255,451; Ser. No. 10/528,269, filed Mar. 17, 2005, now U.S. Pat. No. 7,274,501; and/or Ser. No. 10/993,302, filed Nov. 19, 2004 by Lynam for MIRROR REFLECTIVE ELEMENT FOR A VEHICLE, now U.S. Pat. No. 7,338,177, and/or PCT Application No. PCT/US2004/015424, filed May 18, 2004 by Donnelly Corp. et al. for MIRROR ASSEMBLY FOR VEHICLE, which are all hereby incorporated herein by reference in their entireties, without affecting the scope of the present invention. A variety of mirror accessories and constructions are known in the art, such as those disclosed in U.S. Pat. Nos. 5,555,136; 5,582,383; 5,680,263; 5,984,482; 6,227,675; 6,229,319; and 6,315,421 (which are hereby incorporated herein by reference in their entireties), that can benefit from the present invention. Optionally, the mirror assembly may comprise an electro-optic or electrochromic reflective element assembly, as discussed below.

Optionally, the mirror assembly and/or prismatic or electrochromic reflective element may include one or more displays, such as for the accessories or circuitry described herein. The displays may be similar to those described above, or may be of types disclosed in U.S. Pat. Nos. 5,530,240 and/or 6,329,925, which are hereby incorporated herein by reference in their entireties, and/or may be display-on-demand or transflective type displays, such as the types disclosed in U.S. Pat. Nos. 6,690,298; 5,668,663 and/or 5,724,187, and/or in U.S. patent application Ser. No. 10/054,633, filed Jan. 22, 2002, now U.S. Pat. No. 7,195,381; Ser. No. 11/226,628, filed Sep. 14, 2005 by Karner et al.; Ser. No. 10/993,302, filed Nov. 19, 2004, now U.S. Pat, No. 7,338,177; and/or Ser. No. 11/284,543, filed Nov. 22, 2005, now U.S. Pat. No. 7,370,983; and/or in U.S. provisional applications, Ser. No. 60/732,245, filed Nov. 1, 2005; Ser. No. 60/759,992, filed Jan. 18, 2006; Ser. No. 60/836,219, filed Aug. 8, 2006; Ser. No. 60/525,952, filed Nov. 26, 2003 by Lynam for MIRROR REFLECTIVE ELEMENT FOR A VEHICLE; and/or Ser. No. 60/717,093, filed Sep. 14, 2005 by Lynam, and/or in PCT Application No. PCT/US03/29776, filed Sep. 19, 2003 by Donnelly Corp. et at. for MIRROR REFLECTIVE ELEMENT ASSEMBLY, which are all hereby incorporated herein by reference in their entireties. Optionally, a prismatic reflective element may comprise a display on demand or transflective prismatic element (such as described in PCT Application No. PCT/US03/29776, filed Sep. 19, 2003 by Donnelly Corp. et al. for MIRROR REFLECTIVE ELEMENT ASSEMBLY; and/or U.S. patent application Ser. No. 10/993,302, filed Nov. 19, 2004, now U.S. Pat. No. 7,338,177; and/or U.S. provisional application, Ser. No. 60/525,952, filed Nov. 26, 2003 by Lynam for MIRROR REFLECTIVE ELEMENT FOR A VEHICLE, which are all hereby incorporated herein by reference in their entireties) so that the displays are viewable through the reflective element, while the display area still functions to substantially reflect light, in order to provide a generally uniform prismatic reflective element even in the areas that have display elements positioned behind the reflective element.

Optionally, the display and/or input may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 6,690,268; 6,672,744; 6,386,742; and 6,124,886, and/or U.S. patent application Ser. No. 10/739,766, filed Dec. 18, 2003 by DeLine et al. for MODULAR REARVIEW MIRROR ASSEMBLY, now U.S. Pat. No. 6,877,888; and/or Ser. No. 10/355,454, filed Jan. 31, 2003 by Schofield et al. for VEHICLE ACCESSORY MODULE, now U.S. Pat. No. 6,824,281, and/or PCT Application No. PCT/US03/03012, filed Jan. 31, 2003 by Donnelly Corporation for VEHICLE ACCESSORY MODULE, and/or PCT Application No. PCT/US03/40611, filed Dec. 19, 2003 by Donnelly Corporation for ACCESSORY SYSTEM FOR VEHICLE, and/or PCT Application No. PCT/US04/15424, filed May 18, 2004 by Donnelly Corporation et al. for MIRROR ASSEMBLY FOR VEHICLE, which are hereby incorporated herein by reference in their entireties.

Optionally, the mirror assembly may also or otherwise support or house one or more other accessories or features, such as one or more electrical or electronic devices or accessories. For example, illumination sources or lights, such as map reading lights or one or more other lights or illumination sources, such as illumination sources of the types disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; and/or 5,669,698, and/or U.S. patent application Ser. No. 10/054,633, filed Jan. 22, 2002, now U.S. Pat. No. 7,195,381; Ser. No. 10/745,056, filed Dec. 22, 2003 by Lynam et al. for LIGHT MODULE FOR INTERIOR REARVIEW MIRROR ASSEMBLY, now U.S. Pat. No. 6,971,775; and/or Ser. No. 10/933,842, filed Sep. 3, 2004 by Kulas et al. for INTERIOR REARVIEW MIRROR ASSEMBLY, now U.S. Pat. No. 7,249,860, which are hereby incorporated herein by reference in their entireties, may be included in the mirror assembly. The illumination sources and/or the circuit board may be connected to one or more buttons or inputs for activating and deactivating the illumination sources. Optionally, the mirror assembly may also or otherwise include other accessories, such as microphones, such as analog microphones or digital microphones or the like, such as microphones of the types disclosed in U.S. Pat. Nos. 6,243,003; 6,278,377; and/or 6,420,975, and/or in PCT Application No. PCT/US03/308877, filed Oct. 1, 2003 by Donnelly Corp. et al. for MICROPHONE SYSTEM FOR VEHICLE; and Ser. No. 10/529,715, filed Mar. 30, 2005, published on May 25, 2006 as U.S. Pat. Publication No. US-2006-0109996-A1, which are hereby incorporated herein by reference in their entireties. Optionally, the mirror assembly may also or otherwise include other accessories, such as a telematics system, speakers, antennas, including global positioning system (GPS) or cellular phone antennas, such as disclosed in U.S. Pat. No. 5,971,552, a communication module, such as disclosed in U.S. Pat. No. 5,798,688, a voice recorder, a blind spot detection system, such as disclosed in U.S. Pat. Nos. 5,929,786 and/or 5,786,772, and/or U.S. patent application Ser. No. 10/427,051, filed Apr. 30, 2003, now U.S. Pat. No. 7,038,577; Ser. No. 10/209,173, filed Jul. 31, 2002, now U.S. Pat. No. 6,882,287; and/or Ser. No. 11/315,675, filed Dec. 22, 2005; and/or U.S. provisional application, Ser. No. 60/638,687, filed Dec. 23, 2004, transmitters and/or receivers, such as for a garage door opener or a vehicle door unlocking system or the like (such as a remote keyless entry system), a digital network, such as described in U.S. Pat. No. 5,798,575, a high/low headlamp controller, such as a camera-based headlamp control, such as disclosed in U.S. Pat. Nos. 5,796,094 and/or 5,715,093, a memory mirror system, such as disclosed in U.S. Pat. No. 5,796,176, a hands-free phone attachment, an imaging system or components or circuitry or display thereof, such as an imaging and/or display system of the types described in U.S. Pat. Nos. 6,690,268 and 6,847,487; and/or U.S. provisional applications, Ser. No. 60/614,644, filed Sep. 30, 2004; Ser. No. 60/618,686, filed Oct. 14, 2004; Ser. No. 60/628,709, filed Nov. 17, 2004; Ser. No. 60/644,903, filed Jan. 11, 2005; Ser. No. 60/667,049, filed Mar. 31, 2005; and/or U.S. patent application Ser. No. 11/105,757, filed Apr. 14, 2005; Ser. No. 11/334,139, filed Jan. 18, 2005, now U.S. Pat. No. 7,400,435; and/or Ser. No. 11/239,980, filed Sep. 30, 2005, a slide out or extendable/retractable vide device or module, such as described in U.S. patent application Ser. No. 11/284,543, filed Nov. 22, 2005, now U.S. Pat. No. 7,370,983; and/or Ser. No. 10/538,724, filed Jun. 13, 2005 by Hutzel et al. for ACCESSORY SYSTEM FOR VEHICLE; and/or U.S. provisional applications, Ser. No. 60/630,061, filed Nov. 22, 2004; and/or Ser. No. 60/667,048, filed Mar. 31, 2005; and/or PCT Application No. PCT/US03/40611, filed Dec. 19, 2003, a video device for internal cabin surveillance (such as for sleep detection or driver drowsiness detection or the like) and/or video telephone function, such as disclosed in U.S. Pat. Nos. 5,760,962 and/or 5,877,897, a remote keyless entry receiver, a seat occupancy detector, a remote starter control, a yaw sensor, a clock, a carbon monoxide detector, status displays, such as displays that display a status of a door of the vehicle, a transmission selection (4wd/2wd or traction control (TCS) or the like), an antilock braking system, a road condition (that may warn the driver of icy road conditions) and/or the like, a trip computer, a tire pressure monitoring system (TPMS) receiver (such as described in U.S. Pat. Nos. 6,124,647; 6,294,989; 6,445,287; 6,472,979; and/or 6,731,205; and/or U.S. patent application Ser. No. 11/232,324, filed Sep. 21, 2005 by O'Brien et al. for TIRE PRESSURE ALERT SYSTEM, now U.S. Pat. No. 7,423,522; and/or U.S. provisional application, Ser. No. 60/611,796, filed Sep. 21, 2004, and/or an ONSTAR® system and/or any other accessory or circuitry or the like (with all of the above-referenced patents and PCT and U.S. patent applications being commonly assigned to Donnelly Corporation, and with the disclosures of all of the above referenced patents and patent applications being hereby incorporated herein by reference in their entireties).

Therefore, the present invention provides an interior rearview mirror assembly which may have features, such as electronic accessories and/or displays or the like. The mirror assembly includes a wire cover or wire management assembly or system that is readily assembled at least partially over/around the support arm and channel mount of the mirror mounting assembly or arrangement so as to substantially conceal and contain and manage a mirror wire or wires or cable that extends from the mirror casing (such as a wire or wires that is/are electrically connected to a printed circuit board or circuitry within the mirror casing). The wire cover or wire management assembly or system of the present invention may secure a connecting end of the mirror wire at a location where it is readily accessible and where a vehicle wire and connector may be readily electrically connected to the mirror wire to provide electrical power and control to electronic accessories or circuitry at or of the mirror assembly. The vehicle wire may be readily concealed or routed within and along a channel member that extends along the vehicle windshield to the vehicle headliner. Thus, the wire cover or wire management assembly or system of the present invention substantially conceals and routes/guides electrical wires that may be routed and connected between the headliner of the vehicle and the mirror casing or other pod or module associated with the mirror assembly. The wire cover or wire management assembly or system may be readily attached to the mirror assembly and/or to the vehicle, and a portion of the cover or wire management assembly may be attached after the electrical connections are made so as to ease the assembly and installation process of the mirror assembly at a vehicle assembly plant.

Changes and modification in the specifically described embodiments may be carried out without departing from the principles of the present invention, which is intended to be limited only by the scope of the appended claims as interpreted according to the principles of patent law.

The invention claimed is:

1. An interior rearview mirror assembly for a vehicle, said interior rearview mirror assembly comprising:

a mirror casing;

a mirror reflective element;

a circuit element having electronic circuitry and a mirror wire harness extending therefrom, said mirror wire harness extending from said mirror casing;

a double pivot joint mirror mounting assembly, said double pivot joint mirror mounting assembly comprising a mounting base configured to mount at an interior portion of a vehicle windshield and a support arm for adjustably mounting said mirror reflective element about said mounting base;

said mirror wire harness being routed along an exterior surface of said support arm and an exterior surface of said mounting base;

a support arm sleeve that is attached at an exterior of said support arm;

said mirror wire harness routed substantially along said support arm and within said support arm sleeve so as to be substantially concealed from view at said support arm;

a mounting base cover assembly, said mounting base cover assembly disposed at said mounting base of said double pivot joint mirror mounting assembly, said mounting base cover assembly substantially concealing said mounting base and substantially concealing said mirror wire harness at said mounting base; and an end of said mirror wire harness being configured to be electrically connectable to a connecting end of a vehicle wire harness.

2. The interior rearview mirror assembly of claim 1, wherein said mounting base comprises a first ball member extending therefrom, said double pivot joint mirror mounting assembly comprising a second ball member at said reflective element, said support arm pivotally receiving said first and second ball members so as to adjustably mount said reflective element at the interior surface of the vehicle windshield when said mounting base is mounted at the interior surface of the vehicle windshield.

3. The interior rearview mirror assembly of claim 2, wherein said support arm has a spring disposed in a cavity therein for urging against said ball members to provide resistance of pivotal movement of said support arm about said ball members.

4. The interior rearview mirror assembly of claim 1, wherein said support arm sleeve comprises a channel extending therealong, said channel receiving said mirror wire harness substantially along said exterior surface of said support arm.

5. The interior rearview mirror assembly of claim 1, wherein said support arm sleeve comprises a resilient plastic material.

6. The interior rearview mirror assembly of claim 5, wherein said support arm sleeve comprises a molded plastic support arm sleeve.

7. The interior rearview mirror assembly of claim 1 further comprising an upper channel member that attaches to said mounting base cover assembly and extends between said mounting base cover assembly and the vehicle headliner when said mirror assembly is installed at the vehicle, said upper channel member substantially containing and routing one of said mirror wire harness and the vehicle wire harness therewithin when said mirror assembly is installed at the vehicle.

8. The interior rearview mirror assembly of claim 7, wherein said end of said mirror wire harness is at said upper cover portion when said mirror assembly is mounted at the vehicle, said upper channel member substantially containing and routing the vehicle wire harness therewithin.

9. The interior rearview mirror assembly of claim 7, wherein said end of said mirror wire harness is at the vehicle headliner when said mirror assembly is mounted at the vehicle, said upper channel member substantially containing and routing said mirror wire harness therewithin.

10. The interior rearview mirror assembly of claim 1, wherein said end of said mirror wire harness comprises a connector for electrically connecting said mirror wire harness to a corresponding connector of the vehicle wire harness.

11. The interior rearview mirror assembly of claim 10, wherein said mounting base cover assembly substantially fixedly receives said connector of said mirror wire harness therein.

12. The interior rearview mirror assembly of claim 11, wherein said connector of said mirror wire harness is accessible at an opening at an upper end of said mounting base cover assembly so that the connector of the vehicle wire harness is connectable to said connector of said mirror wire harness when said mounting base cover assembly is disposed at said mounting base.

13. The interior rearview mirror assembly of claim 12, wherein said mounting base cover assembly comprises an upper cover portion and a lower cover portion, said upper and lower cover portions being connectable together at said mounting base of said double pivot joint mirror mounting assembly.

14. The interior rearview mirror assembly of claim 13, wherein said upper cover portion substantially conceals said mirror wire harness at said mounting base.

15. The interior rearview mirror assembly of claim 14, wherein said end of said mirror wire harness is at said upper cover portion.

16. The interior rearview mirror assembly of claim 1, wherein said circuit element comprises a printed circuit board having said mirror wire harness attached thereto.

17. The interior rearview mirror assembly of claim 16, wherein individual wires of said mirror wire harness are soldered to said printed circuit board.

18. An interior rearview mirror assembly for a vehicle, said interior rearview mirror assembly comprising:
a mirror casing;
a mirror reflective element;
a circuit element having electronic circuitry and a mirror wire harness extending therefrom, said mirror wire harness extending from said mirror casing;
a double pivot joint mirror mounting assembly, said double pivot joint mirror mounting assembly comprising a mounting base configured to mount at an interior portion of a vehicle windshield and a support arm for adjustably mounting said mirror reflective element about said mounting base, said support arm comprising a spring disposed in a cavity therein for urging against ball members at said mounting base and said mirror reflective element to provide resistance of pivotal movement of said support arm about said ball members;
said mirror wire harness being routed along an exterior surface of said support arm and an exterior surface of said mounting base, an end of said mirror wire harness being configured to be electrically connectable to a connecting end of a vehicle wire harness;
a support arm sleeve that is attached at an exterior of said support arm;
said mirror wire harness routed substantially along said support arm and within said support arm sleeve so as to be substantially concealed from view at said support arm;
a mounting base cover assembly, said mounting base cover assembly disposed at said mounting base of said double pivot joint mirror mounting assembly, said mounting base cover assembly substantially concealing said mounting base and substantially concealing said mirror wire harness at said mounting base;
an upper channel member attached at an upper portion of said mounting base cover assembly and configured to extend at least partially along the vehicle windshield and above said mounting base cover assembly, said upper channel member substantially concealing at least one of said mirror wire harness and the vehicle wire harness therein; and
wherein said support arm sleeve, said mounting base cover assembly and said upper channel member, when all assembled in the vehicle, cooperate to substantially conceal the entire routing of said mirror wire harness along substantially its entire length from its exit or entrance at said mirror casing to its exit or entrance at the vehicle headliner.

19. The interior rearview mirror assembly of claim 18, wherein said support arm sleeve comprises a channel extending therealong, said channel receiving said mirror wire harness substantially along said exterior surface of said support arm.

20. The interior rearview mirror assembly of claim 18, wherein said mounting base cover assembly comprises an upper cover portion and a lower cover portion, said upper and lower cover portions being connectable together at said mounting base of said double pivot joint mirror mounting assembly, wherein at least said upper cover portion substantially conceals said mirror wire harness at said mounting base.

21. The interior rearview mirror assembly of claim 18, wherein said circuit element comprises a printed circuit board having said mirror wire harness attached thereto.

22. The interior rearview mirror assembly of claim 21, wherein individual wires of said mirror wire harness are soldered to said printed circuit board.

23. An interior rearview mirror assembly for a vehicle, said interior rearview mirror assembly comprising:

a mirror casing;

a mirror reflective element;

a circuit element having electronic circuitry and a mirror wire harness extending therefrom, said circuit element comprising a printed circuit board having individual wires of said mirror wire harness soldered to said printed circuit board, a connecting end of said mirror wire harness extending from said mirror casing;

a double pivot joint mirror mounting assembly, said double pivot joint mirror mounting assembly comprising a mounting base configured to mount at an interior portion of a vehicle windshield and a support arm for adjustably mounting said mirror reflective element about said mounting base;

said mirror wire harness being routed along an exterior surface of said support arm and an exterior surface of said mounting base;

a support arm sleeve that is attached at an exterior of said support arm;

said mirror wire harness routed substantially along said support arm and within said support arm sleeve so as to be substantially concealed from view at said support arm;

a mounting base cover assembly, said mounting base cover assembly disposed at said mounting base of said double pivot joint mirror mounting assembly, said mounting base cover assembly substantially concealing said mounting base and substantially concealing said mirror wire harness at said mounting base; and said connecting end of said mirror wire harness being configured to be electrically connectable to a connecting end of a vehicle wire harness.

24. The interior rearview mirror assembly of claim 23, wherein said support arm comprises a spring disposed in a cavity therein for urging against ball members at said mounting base and said mirror reflective element to provide resistance of pivotal movement of said support arm about said ball members.

25. The interior rearview mirror assembly of claim 23 further comprising an upper channel member attached at an upper portion of said mounting base cover assembly and configured to extend at least partially along the vehicle windshield and above said mounting base cover assembly, said upper channel member substantially concealing at least one of said mirror wire harness and the vehicle wire harness therein.

26. The interior rearview mirror assembly of claim 23, wherein said support arm sleeve comprises a channel extending therealong, said channel receiving said mirror wire harness substantially along said exterior surface of said support arm.

27. The interior rearview mirror assembly of claim 23, wherein said mounting base cover assembly comprises an upper cover portion and a lower cover portion, said upper and lower cover portions being connectable together at said mounting base of said double pivot joint mirror mounting assembly, wherein at least said upper cover portion substantially conceals said mirror wire harness at said mounting base.

28. The interior rearview mirror assembly of claim 23, wherein said connecting end of said mirror wire harness is at said mounting base cover assembly when said mirror assembly is mounted at the vehicle.

29. The interior rearview mirror assembly of claim 23, wherein said connecting end of said mirror wire harness is at the vehicle headliner when said mirror assembly is mounted at the vehicle.

* * * * *

UNITED STATES PATENT AND TRADEMARK OFFICE
CERTIFICATE OF CORRECTION

PATENT NO. : 7,510,287 B2 Page 1 of 1
APPLICATION NO. : 11/584697
DATED : March 31, 2009
INVENTOR(S) : Richard R. Hook It is certified that error appears in the above-identified patent and that said Letters Patent is hereby corrected as shown below:

Column 6:
Line 28, "clement" should be --element--.
Line 31, Insert --joint-- between "pivot" and "mounting".

Column 14:
Line 18, "covet" should be --cover--.
Line 56, "flied" should be --filed--.

Column 15:
Line 2, "though" should be --through--.

Signed and Sealed this

First Day of December, 2009

David J. Kappos
*Director of the United States Patent and Trademark Office*